(12) United States Patent
Akabori et al.

(10) Patent No.: US 8,425,100 B2
(45) Date of Patent: Apr. 23, 2013

(54) LUMINOUS BUTTON DEVICE AND ELECTRONIC APPARATUS

(75) Inventors: Takahiro Akabori, Gunma (JP); Takayuki Tateno, Chiba (JP); Shingo Fukutomi, Chiba (JP); Akihiro Tomita, Chiba (JP)

(73) Assignee: Sony Corporation, Tokyo (JP)

( * ) Notice: Subject to any disclaimer, the term of this patent is extended or adjusted under 35 U.S.C. 154(b) by 276 days.

(21) Appl. No.: 13/020,575

(22) Filed: Feb. 3, 2011

(65) Prior Publication Data

US 2011/0194303 A1 Aug. 11, 2011

(30) Foreign Application Priority Data

Feb. 10, 2010 (JP) ................................ P2010-028225

(51) Int. Cl.
*F21V 7/04* (2006.01)
*G01D 11/28* (2006.01)

(52) U.S. Cl.
USPC ............. 362/551; 362/86; 362/603; 362/555; 362/249.05; 362/311.01

(58) Field of Classification Search ............. 362/23, 362/24, 29, 30, 551, 603, 605, 606, 612, 362/632, 555, 85–88, 249.05, 249.12, 311.01, 362/311.02

See application file for complete search history.

(56) References Cited

U.S. PATENT DOCUMENTS

| 5,093,764 A * | 3/1992 | Hasegawa et al. ............. 362/29 |
| 6,224,221 B1 * | 5/2001 | Glienicke ........................ 362/23 |
| 6,565,223 B2 * | 5/2003 | Liao et al. ........................ 362/26 |
| 6,860,612 B2 * | 3/2005 | Chiang et al. ................... 362/29 |
| 2006/0171136 A1 * | 8/2006 | Horoho et al. .................. 362/23 |

FOREIGN PATENT DOCUMENTS

JP 2000-106059 4/2000

* cited by examiner

*Primary Examiner* — Evan Dzierzynski
*Assistant Examiner* — Danielle Allen
(74) *Attorney, Agent, or Firm* — Finnegan, Henderson, Farabow, Garrett & Dunner, LLP

(57) ABSTRACT

A luminous button device includes: a button base which is integrally formed of a transmissive material; and a button cap which is integrally formed of a non-transmissive material and is fitted to the button base, wherein the button cap includes a cap body; a pair of arm portions which extends from the rear surface of the cap body with a gap interposed therebetween; and a pair of locking claws which is formed at the front ends of the pair of arm portions, and wherein the button base includes a movable portion which is movable in the direction of pressing a switch disposed on the rear surface side of the button base in accordance with a pressing force from the front button surface side; and a support portion which supports the movable portion so as to be movable in the direction.

6 Claims, 19 Drawing Sheets

LUMINOUS BUTTON DEVICE AND ELECTRONIC APPARATUS

BACKGROUND OF THE INVENTION

1. Field of the Invention

The present invention relates to a luminous button device that illuminates the periphery of a button, and an electronic apparatus.

2. Description of the Related Art

Operation buttons are provided in the operation panels of various electronic apparatuses. For example, operation buttons such as a power button, a recording button, and a play button are used to perform various operations. In recent years, an operation button has been introduced which emits light from the periphery of the button when a user presses down the operation button. For example, when the user presses down a recording button provided on a video recording apparatus, a predetermined color of light is emitted from the periphery of the recording button. Accordingly, the user may easily recognize that a video recording operation of the video recording apparatus is performed.

It is desirable that this kind of luminous button has a structure in which a non-transmissive button cap is bonded to a transmissive button base formed to surround the periphery of the button cap, and a light emitting element is provided on the rear surface side of the button base from the viewpoint of easy production and cost. According to the structure of the button, light emitted from the light emitting element reaches the front button surface while being transmitted through the inside of the button base, and is emitted from the periphery of the button cap.

As a method of bonding the two components, that is, the button cap and the button base formed of different types of materials, a fitting structure using a locking claw is known. For example, Japanese Unexamined Patent Application Publication No. 2000-106059 discloses a structure in which a pair of arm portions each having a locking claw formed at its front end is provided in one component, and the arm portions are inserted into an insertion hole provided in the other component so that both components are fitted to each other by the locking claws.

SUMMARY OF THE INVENTION

However, in the fitting structure in which the locking claws of one component are simply inserted into the insertion hole of the other component as in Japanese Unexamined Patent Application Publication No. 2000-106059, the pair of arm portions may be easily separated from the insertion hole when they move close to each other due to an external force, so that both components are separated from each other in some cases. A method of using a locking claw protruding at an acute angle in a direction perpendicular to the arm portion may be supposed in order to prevent the separation of the locking claws. However, in order to mold the button cap with the locking claws, a complex mold with a slide structure is demanded. Further, a method of mounting a spacer between the pair of arm portions inserted into the insertion hole may be considered in order to prevent the separation of the locking claws. However, in this method, since it is necessary to perform the mounting operation of the spacer as an additional component, the fitting operation between the button base and the button cap becomes complex and troublesome.

Further, in the fitting structure of Japanese Unexamined Patent Application Publication No. 2000-106059, since it is difficult to insert the pair of arm portions with large locking claws into the narrow insertion hole, the fitting operation between the button cap and the button base is not easy. Accordingly, a fitting structure has been demanded in which the locking claws of the button cap are easily inserted into the insertion hole of the button base, and the locking claws are difficult to separate from the insertion hole after insertion.

In the luminous button, it is necessary to uniformly emit light from a light emitting portion in the periphery of the button without any irregularity in the light emission. However, when the fitting structure between the button cap and the button base is not appropriate, the transmission of the light inside the button base is degraded due to the structure thereof, and the light emission of the light emitting portion in the periphery of the button cap becomes irregular, so that the light is not emitted therefrom in a uniform shape (for example, an annular shape). Accordingly, a fitting structure is also demanded in which the button cap and the button base are appropriately fitted to each other so that the light emission in the periphery of the button is not degraded.

Therefore, it is desirable to provide a luminous button device having a fitting structure in which light is uniformly emitted from the periphery of the button without any irregularity in the light emission, the button cap and the button base are easily fitted to each other, and the button cap and the button base are difficult to separate from each other after they are fitted to each other.

According to an embodiment of the invention, there is provided a luminous button device including: a button base which is integrally formed of a transmissive material; and a button cap which is integrally formed of a non-transmissive material and is fitted to the button base, wherein the button cap includes: a cap body; a pair of arm portions which extends from the rear surface of the cap body with a gap interposed therebetween; and a pair of locking claws which is formed at the front ends of the pair of arm portions, wherein the button base includes: a movable portion which is movable in a direction a switch disposed on the rear surface side of the button base is pressed in accordance with a pressing force from the front button surface side; and a support portion which supports the movable portion so as to be movable in the direction, and wherein the movable portion of the button base includes: a light guiding portion which guides light emitted from a light emitting element disposed on the rear surface side of the button base to an end portion on the front button surface side; a fitting portion which is formed on the front button surface side of the light guiding portion, and is fitted to the cap body so as to surround the outer periphery of the cap body of the button cap; an engagement portion which is formed inside the light guiding portion, has an insertion hole allowing the pair of locking claws of the button cap to be inserted thereinto, and engages with the pair of locking claws inserted into the insertion hole; and a rib which is formed in a trigonal pyramid shape in the inner surface of the insertion hole in a protruding manner, and includes a pair of inclined surfaces disposed at positions respectively corresponding to the pair of locking claws inserted into the insertion hole.

When the pair of locking claws is inserted into the insertion hole, the pair of locking claws may respectively come into contact with the pair of inclined surfaces of the rib so as to be twisted along the pair of inclined surfaces. When the pair of locking claws inserted into the insertion hole engages with the engagement portion, the rib may be interposed between the pair of arm portions or the pair of locking claws.

The cap body may be formed in a disc shape. The light guiding portion may be formed in a cylindrical shape which extends from the front button surface to the rear button surface and of which the central axis is the optical axis of the light emitting element.

A tapered light incident surface may be formed in the inner peripheral surface of the light guiding portion so as to face the light emitting element.

The button cap may be molded by using a mold having an undercut portion corresponding to the locking claws.

According to another embodiment of the invention, there is provided an electronic apparatus including: the above-described luminous button device; and a control unit configured to perform a predetermined operation on the basis of a signal generated when the luminous button device is operated.

With the above-described configuration, when the button cap and the button base are fitted to each other, the cap body of the button cap is fitted to the fitting portion of the button base, the periphery of the cap body is surrounded by the fitting portion, and the pair of locking claws of the button cap is inserted into the insertion hole of the button base so as to engage with the engagement portion in the periphery of the insertion hole. Since the pair of locking claws is deformed along the rib inside the insertion hole at the time of the inserting operation of the locking claws, the locking claws may be easily inserted into the insertion hole. Further, since the rib sandwiched between the pair of locking claws suppresses the locking claws from being bent inward after engagement, the locking claws are difficult to separate from the insertion hole. Further, since the light emitted from the light emitting element is guided to the light emitting portion (the fitting portion surrounding the outer periphery of the cap body) in the end portion of the light guiding portion on the front button surface side while being transmitted through the inside of the cylindrical light guiding portion of the button base, a large amount of light may be uniformly guided to the light emitting portion.

As described above, the luminous button device according to the embodiment of the invention may provide a fitting structure in which light may be uniformly emitted from the periphery of the button without any irregularity in the light emission, the button cap and the button base may be easily fitted to each other, and the button cap and the button base are difficult to separate from each other after they are fitted to each other.

DESCRIPTION OF THE PREFERRED EMBODIMENTS

Figure 1:
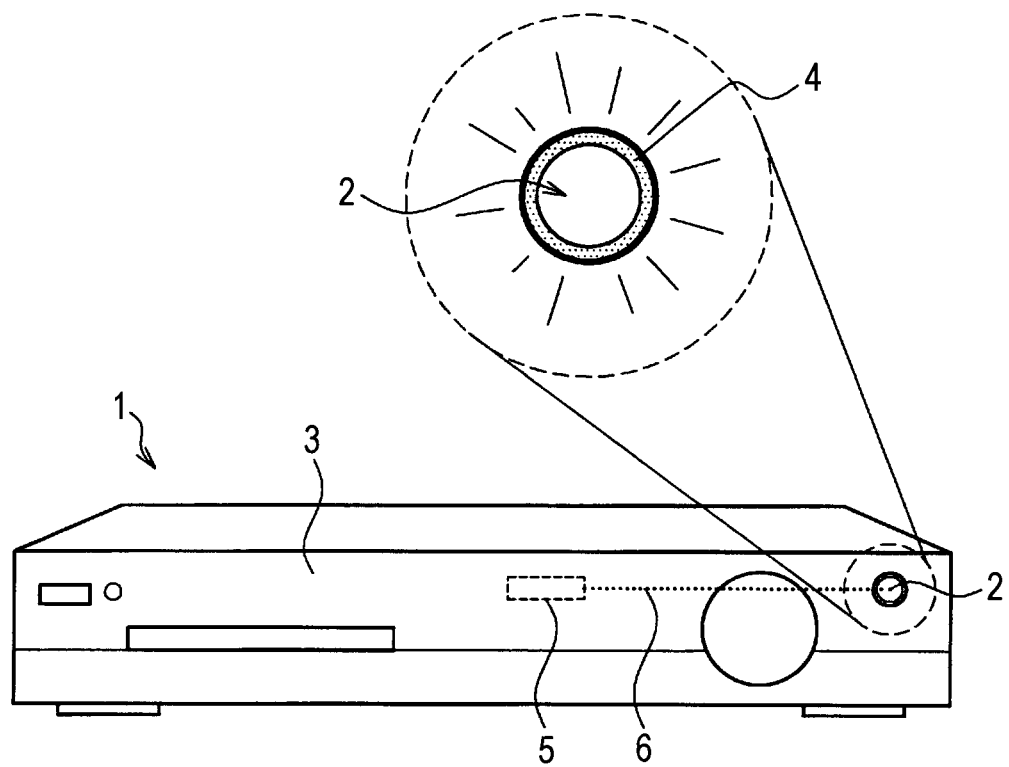
FIG. 1 is an external view illustrating an electronic apparatus having a luminous button device according to an embodiment of the invention.

Hereinafter, a preferred embodiment of the invention will be described in detail by referring to the accompanying drawings. Further, since the same reference numerals are given to the components substantially having the same functions in the specification and the drawings, the description thereof will not be repeated.

Further, the description will be conducted in the following order.
1. Outline of luminous button
2. Configuration of button cap and button base
3. Fitting structure between button cap and button base
4. Light emitting structure around button
5. Molding method of button cap and button base
6. Summary
1. Outline of Luminous Button First, an outline of a luminous button device according to an embodiment of the invention will be described by referring to FIG. 1. FIG. 1 is an external view illustrating an electronic apparatus having a luminous button device according to the embodiment.

As shown in FIG. 1, the luminous button device according to the embodiment is used as an operation button 2 provided in an electronic apparatus 1. The operation button 2 is provided on, for example, a front panel 3 of the electronic apparatus 1, and a user may input various commands to the electronic apparatus 1 by pressing down the operation button 2. Further, the front panel 3 corresponds to an operation panel in the electronic apparatus 1 of FIG. 1. The electronic apparatus 1 includes a control unit 5 which controls respective parts inside the electronic apparatus 1, and the control unit 5 is connected to the operation button 2 via a wiring 6. When the operation button 2 is operated by the user, the operation button 2 generates a predetermined input signal, and outputs the signal to the control unit 5. The control unit 5 conducts a predetermined operation (for example, an operation of controlling the respective parts of the electronic apparatus 1) on the basis of the input signal.

In the example shown in the drawing, the electronic apparatus 1 equipped with the operation button 2 is a home theater device that reproduces and outputs data of video/audio content, and the operation button 2 serves as an audio/video recording button which is used by the user to record content data in a recording medium. The user may command the home theater device to start or finish an audio/video recording operation by pressing down the operation button 2 serving as the audio/video recording button. The control unit 5 controls a recording unit (not shown in the drawings) inside the home theater device so that the content data is recorded on the recording medium in accordance with the operation with respect to the operation button 2. As shown in the enlarged view of FIG. 1, an annular light emitting portion 4 provided in the periphery of the operation button 2 emits light during the recording operation of the home theater device. Since the light emitting portion 4 emits light in the periphery of the button, the user may easily recognize whether the home theater device is in an audio/video recording state.

As described above, the operation button 2 according to the embodiment is configured as the luminous button device, and has a function of receiving the user's operation from an operation switch having a predetermined function as well as a function informing the user of the operation state of the electronic apparatus 1 by emitting light from the light emitting portion 4 in the periphery of the button. Hereinafter, a configuration of the operation button 2 as the luminous button device according to the embodiment will be described in detail.

Further, the electronic apparatus equipped with the luminous button device may be applied to an arbitrary electronic apparatus equipped with an operation button such as a video/audio record/reproduction device (for example, a blu-ray disc/DVD recorder), a television receiver, a system stereo device, an imaging device (for example, a digital camera and a digital video camera), a portable terminal (for example, a portable terminal, a portable music/video player, a game console, and an IC recorder), a personal computer, a game unit, a car navigation device, a digital photo frame, home appliances, a vending machine, an ATM, and a kiosk terminal as well as the home theater device. The luminous button device may be applied to various operation buttons such as a power button, a play button, a rewind and fast forward button, a volume control button, an input selection button, and a shutter button as well as the audio/video recording button.

2. Configuration of Button Cap and Button Base

Figure 2A:
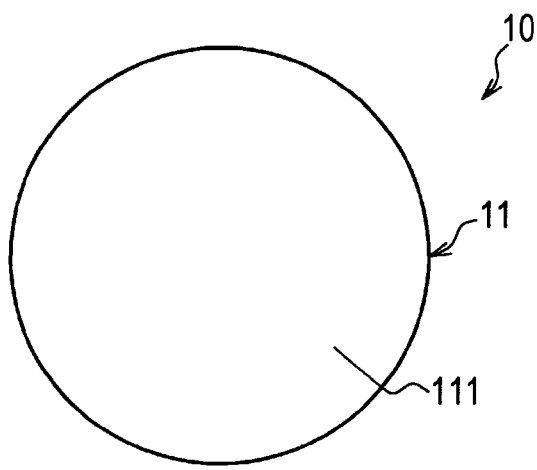
FIG. 2A is a front view illustrating a button cap according to the embodiment.
Figure 2B:
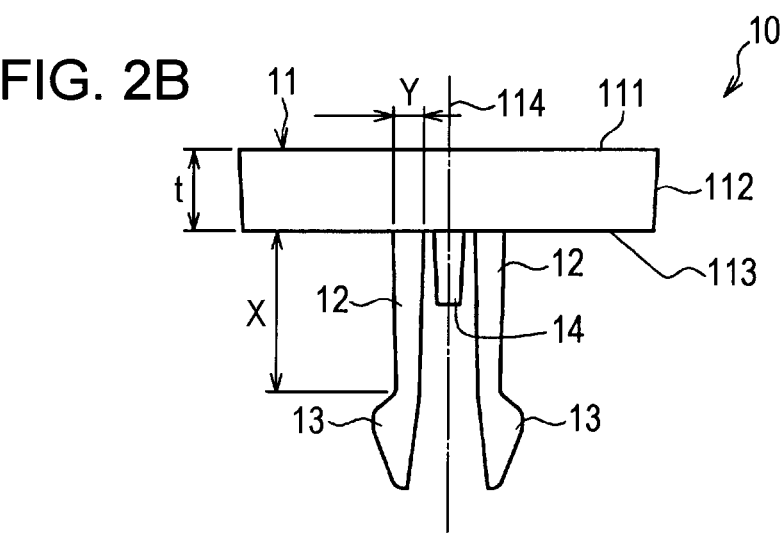
FIG. 2B is a bottom view illustrating the button cap.
Figure 2C:
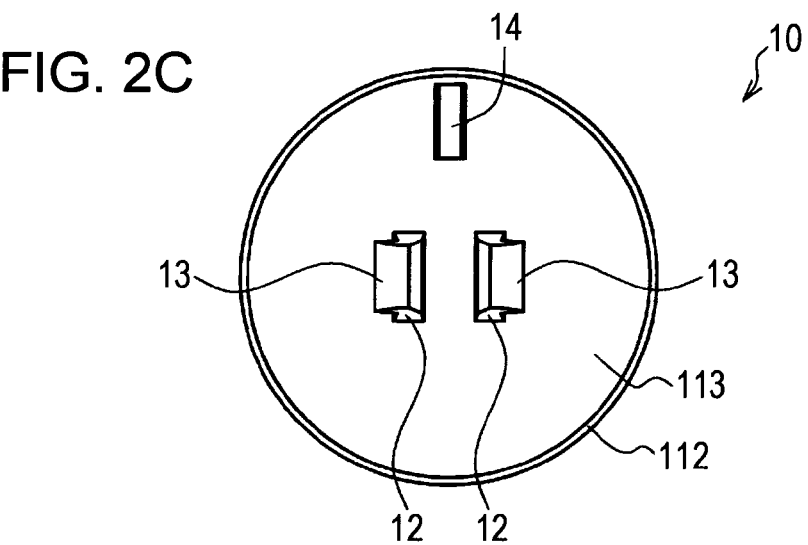
FIG. 2C is a rear view illustrating the button cap.
Figure 3A:
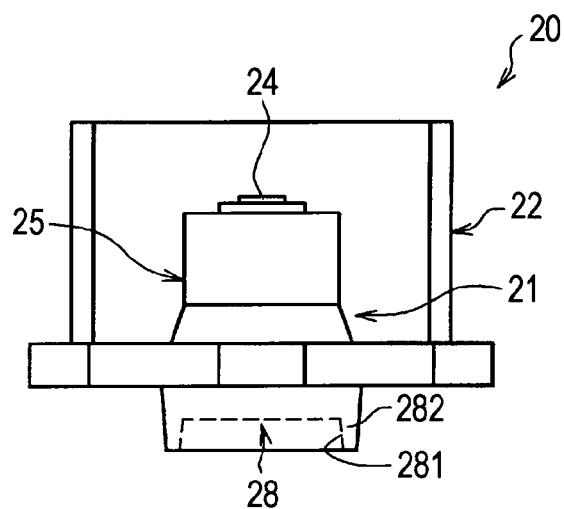
FIG. 3A is a plan view illustrating a button base according to the embodiment.
Figure 3B:
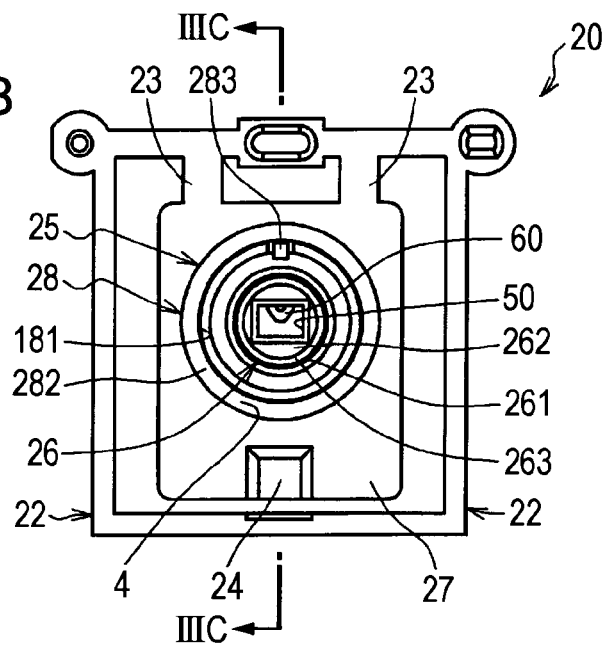
FIG. 3B is a front view illustrating the button base.
Figure 3C:
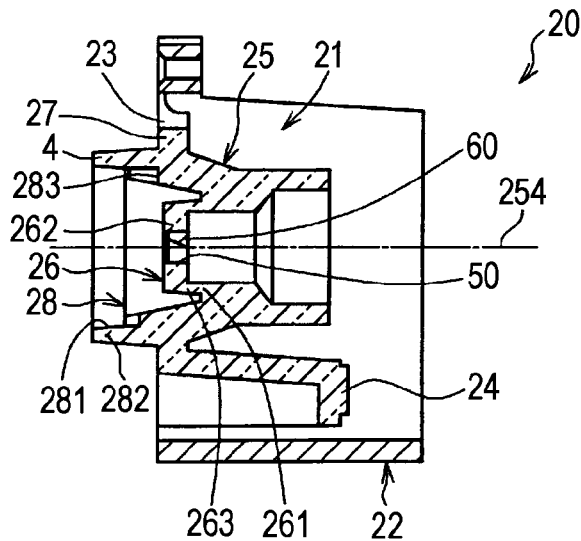
FIG. 3C is a longitudinal sectional view taken along the line IIIC-IIIC.
Figure 4A:
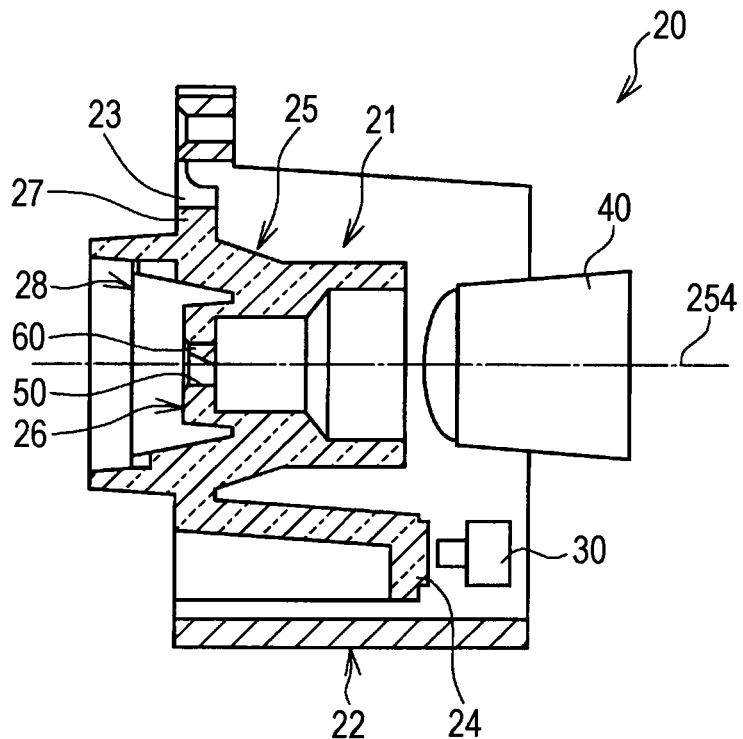
FIGS. 4A and 4B are longitudinal sectional views illustrating a moving state of a movable portion of the button base according to the embodiment.
Figure 4B:
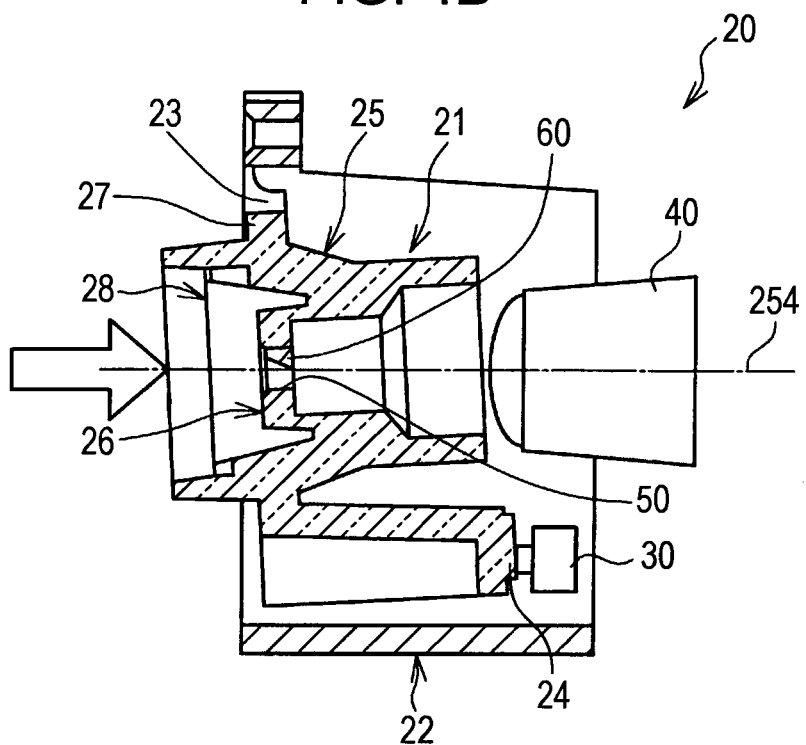
Figure 5:
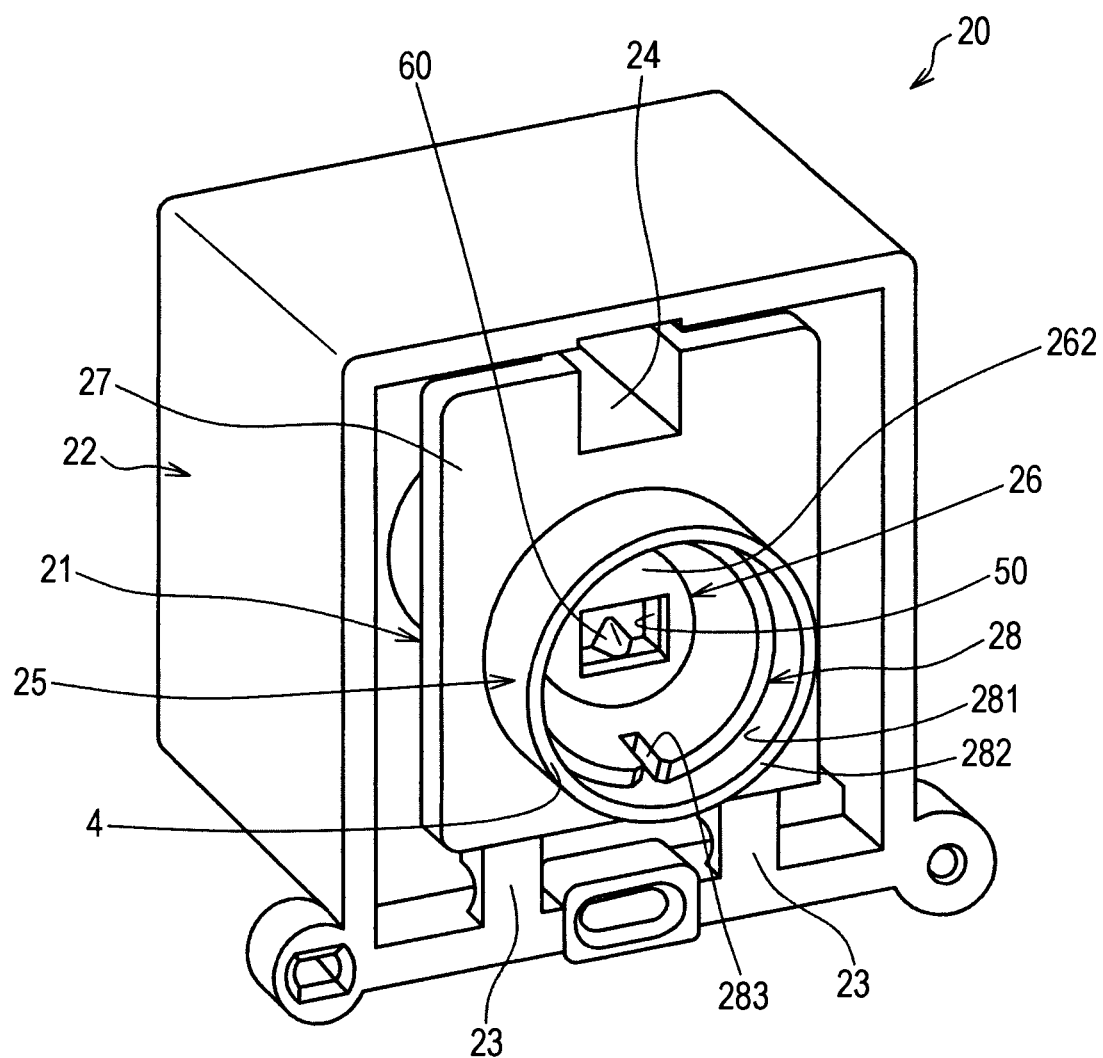
FIG. 5 is a perspective view illustrating the button base according to the embodiment.

Next, a configuration of a button cap 10 and a button base 20 constituting the operation button 2 (luminous button device) according to the embodiment will be described by referring to FIGS. 2A to 5. FIG. 2A is a front view illustrating the button cap 10 according to the embodiment, FIG. 2B is a bottom view illustrating the button cap 10, and FIG. 2C is a rear view illustrating the button cap 10. FIG. 3A is a plan view illustrating the button base 20 according to the embodiment, FIG. 3B is a front view illustrating the button base 20, and FIG. 3C is a longitudinal sectional view taken along the line IIIC-IIIC. FIGS. 4A and 4B are longitudinal sectional views illustrating a moving state of a movable portion 21 of the button base 20 according to the embodiment. FIG. 5 is a perspective view illustrating the button base 20 according to the embodiment.

The operation button 2 includes the button cap 10 and the button base 20 which are fitted to each other, and also includes a switch 30 and a light emitting element 40 (refer to FIGS. 4A and 4B) which are disposed on the rear surface side of the button base 20. The operation portion of the operation button 2 is formed by fitting two components, that is, the button cap 10 and the button base 20 to each other. Among these, the button cap 10 is disposed on the front surface side of the operation button 2 so as to be exposed to the outside (refer to FIG. 1), and the button base 20 is disposed on the rear surface side of the operation button 2 so as to be embedded in the electronic apparatus 1. Hereinafter, a configuration of the button cap 10 and the button base 20 will be described in detail.

Further, in the following description, the front button surface indicates the front surface (the surface exposed to the outside on the front panel 3 of the electronic apparatus 1) of the operation button 2, and the rear button surface indicates the rear surface (the surface embedded in the electronic apparatus 1) of the operation button 2. The front/rear direction of the button indicates a direction (that is, a direction in which a user presses the button) perpendicular to the front and rear surfaces of the button.

First, a configuration of the button cap 10 will be described in detail by referring to FIGS. 2A to 2C. As shown in FIGS. 2A to 2C, the button cap 10 is a cap member disposed on the front surface side of the operation button 2, and covers the front surface of the operation button 2. The button cap 10 is integrally molded from a colored non-transmissive material (for example, a synthetic resin such as plastic). For this reason, the light emitted by a light emitting element 40 (refer to FIGS. 4A and 4B) to be described later is not transmitted through the non-transmissive button cap 10. The button cap 10 includes: a cap body 11; a pair of arm portions 12 extending toward the rear surface of the cap body 11; a locking claw 13 formed in the front end of each arm portion 12; and a locking protrusion 14 formed on the rear surface side of the cap body 11 in a protruding manner.

The cap body 11 is a portion exposed from the front button surface side, and is a portion contacting a user's finger when the user presses down the operation button 2. The cap body 11 is provided so as to improve the decoration of the luminous button device. The cap body 11 is formed as, for example, a disc-shaped member, and the diameter of the cap body 11 is adjusted to a size suitable for the operation button 2 that is pressed down by the user. As shown in FIG. 2A, a front surface 111 (front button surface) of the cap body 11 is a flat surface subjected to mirror-like finishing. Further, as shown in FIG. 2B, an outer peripheral surface 112 of the cap body 11 is formed as a tapered surface of which the diameter is reduced from the front surface 111 toward a rear surface 113.

A pair of arm portions 12 and a locking protrusion 14 are formed in the rear surface 113 of the cap body 11 in a protruding manner. The cap body 11 is fitted to a fitting portion 28 (refer to FIGS. 3A to 3C) formed in a front button surface side of the button base 20 in a depressed manner.

The arm portions 12 have a function of supporting the locking claws 13. The pair of arm portions 12 extends from the center portion of the rear surface 113 of the cap body 11 in a direction substantially perpendicular to the plate surface of the cap body 11 (that is, a direction facing the rear button surface) so as to be substantially parallel to each other. The pair of arm portions 12 is formed in a bilaterally symmetrical shape with respect to a central axis 114 of the cap body 11, and is disposed so as to face each other with a predetermined gap therebetween. The base portion side of each arm portion 12 is formed as, for example, a band-shaped member having a rectangular cross-section, and the locking claw 13 is formed in the front end of the arm portion 12 in a protruding manner. The arm portion 12 may be elastically deformed to a certain extent depending on its material. Accordingly, the pair of arm portions 12 may move close to each other or move away from each other due to an external force.

The locking claw 13 has a function of allowing the button cap 10 to engage with the button base 20. The pair of locking claws 13 protrudes outward from the front ends of the pair of arm portions 12. The perpendicular cross-section (cross-section parallel to the central axis 114) of the locking claw 13 has a substantially triangular shape, and the perpendicular cross-section (cross-section perpendicular to the central axis 114) has a substantially rectangular shape. The pair of locking claws 13 is inserted into the insertion hole 50 (refer to FIGS. 3A to 3C) of the button base 20 so as to lock the button base 20 when the button cap 10 is fitted to the button base 20. Further, the locking claw 13 shown in the example is a triangular protrusion protruding to the outside of the arm portion 12, but may be a protrusion having, for example, a semi-circular shape, a semi-oval shape, or a trapezoid shape.

The locking protrusion 14 has a function of preventing the button cap 10 from rotating with respect to the button base 20, and a function of preventing the button cap 10 from being reversed in the vertical direction to be attached to the button base 20. The locking protrusion 14 protrudes from the end portion of the rear surface 113 of the cap body 11 in a direction substantially perpendicular to the plate surface of the cap body 11. The locking protrusion 14 is fitted to a concave portion 283 (refer to FIGS. 3A to 3C) of the button base 20 when the button cap 10 is fitted to the button base 20. Accordingly, the button cap 10 may be prevented from rotating with respect to the button base 20.

Further, FIGS. 2A to 2C illustrate the dimensions of the respective parts of the button cap 10 according to the embodiment. For example, the length X of the arm portion 12 is set to 4 mm. The button cap 10 is molded by an injection mold to be described later. However, since it is necessary to provide a draft angle for the mold, the arm portion 12 becomes thinner as it extends to the front end thereof. Since the strength of the locking claw 13 decreases as the front end of the arm portion 12 becomes thinner, it is desirable that the length X is 4 mm in the case where the arm portion 12 has the shape shown in the drawing.

Further, for example, the thickness t of the cap body 11 is set to 2.2 mm, and the thickness Y of the base of the arm portion 12 is set to 0.8 mm. When the base of the arm portion 12 is thickened, it is desirable that $Y \leq t/2$ since sink (defective molding phenomenon) occur in the front surface 111 (appearance surface) of the cap body 11 at the rear of the arm portion 12. The front surface 111 of the button cap 10 according to the embodiment is a high glossy surface, and the thickness Y is set to 0.8 mm since sink may more easily recognized than a general case.

Next, a configuration of the button base 20 will be described in detail by referring to FIGS. 3A to 5. As shown in FIGS. 3A to 5, the button base 20 serves as the base of the operation button 2, and is embedded in the electronic apparatus 1. The button base 20 is integrally molded from a transparent or non-transmissive material (for example, a synthetic resin such as plastic). For this reason, the light emitted from the light emitting element 40 (refer to FIGS. 4A and 4B) to be described later is transmitted through the inside of the transmissive button base 20.

The button base 20 mainly includes: the movable portion 21 which is fitted to the button cap 10; a support frame 22 which movably supports the movable portion 21; and a connection portion 23 which connects the movable portion 21 and the support frame 22 to each other.

The movable portion 21 has a function of pressing a switch 30 (refer to FIGS. 4A and 4B) disposed on the rear surface side of the button base 20 by being moved in a direction facing the rear button surface in accordance with the button pressing force. The movable portion 21 is disposed inside the rectangular frame-shaped support frame 22, and is supported by the support frame 22 so as to be movable in a direction of pressing the switch 30 (that is, a direction facing the front button surface and the rear button surface).

The support frame 22 serves as a support portion that movably supports the movable portion 21. The support frame 22 is fixed to the body of the electronic apparatus 1, and supports the movable portion 21 through the connection portion 23. The support frame 22 is a hollow rectangular frame, and is disposed so as to surround the periphery of the movable portion 21. The connection portion 23 is provided at, for example, two positions in the upper end of the movable portion 21, and connects the movable portion 21 and the support frame 22 to each other. As described above, since the button base 20 is integrally molded from a material such as a synthetic resin, the connection portion 23 may be elastically deformed to a certain extent. Accordingly, the movable portion 21 relatively moves with respect to the support frame 22 due to the elastic deformation of the connection portion 23.

Here, an operation of pressing the switch 30 by the movable portion 21 will be described in detail by referring to FIGS. 4A and 4B. As shown in FIGS. 4A and 4B, the light emitting element 40 is disposed at the center of the rear surface side of the button base 20, and the switch 30 is disposed at the lower portion on the rear surface side of the button base 20. A protrusion 24 is provided at the lower end of the movable portion 21 of the button base 20 so as to protrude in the direction facing the rear button surface, and the switch 30 is disposed so as to face the protrusion 24.

When the user presses down the operation button 2 with their finger as shown in FIG. 4A, the movable portion 21 of the button base 20 is pressed in the direction facing the rear button surface due to the pressing force of the user. Then, the connection portion 23 is elastically deformed in accordance with the pressing force as shown in FIG. 4B, so that the movable portion 21 rotates about the connection portion 23 by a predetermined angle in the direction facing the rear button surface and relatively moves in the direction facing the rear button surface with respect to the support frame 22. Accordingly, the protrusion portion 24 of the lower portion of the movable portion 21 moves toward the rear button surface, so that the switch 30 is pressed down. As a result, the switch 30 is operated, and an input signal (for example, an audio/ video recording start command signal) corresponding to the operation button 2 is transmitted to the control unit of the electronic apparatus 1.

Further, when the user detaches their finger from the operation button 2 so that the pressing force is released, the movable portion 21 rotates about the connection portion 23 in the direction facing the front button surface and returns from the position of FIG. 4B to the position of FIG. 4A. As described above, the movable portion 21 of the button base 20 presses down the switch 30 by being rotated in the direction facing the rear button surface in accordance with the pressing operation of the operation button 2, and is separated from the switch 30 by being rotated about the connection portion 23 in the direction facing the front button surface when the pressing operation of the operation button 2 stops. The switch 30 of the operation button 2 may be turned on or off in accordance with the movement of the movable portion 21.

Subsequently, the respective parts of the movable portion 21 of the button base 20 will be described in detail by referring to FIGS. 3A to 5. As shown in FIGS. 3A to 5, the movable portion 21 of the button base 20 includes the protrusion 24, a light guiding portion 25, a cap engagement portion 26, a support plate 27, and the fitting portion 28.

The light guiding portion 25 is a cylindrical member which is formed in a cylindrical shape extending from the front button surface side to the rear button surface side, and is symmetrical in the circumferential direction about an optical axis 41 of the light emitting element 40 to be described later. For example, the cylindrical shape of the light guiding portion 25 is a substantially cylindrical shape of which a central axis 254 is the optical axis 41 of the light emitting element 40. However, the cylindrical shape of the light guiding portion 25 is not limited to the cylindrical shape, but may be a cylindrical shape having an arbitrary cross-section such as a square cylindrical shape, a triangular cylindrical shape, an oval cylindrical shape, and a tapered cylindrical shape. The light guiding portion 25 is supported by the support plate 27 having a rectangular flat plate shape, and the central axis 254 of the light guiding portion 25 is parallel to the front/rear direction of the button when the operation button 2 is not pressed down. The light guiding portion 25 has a function of guiding the light emitted from the light emitting element 40 provided on the rear surface side (rear button surface side) of the button base 20 toward the end portion (corresponding to the light emitting portion 4 of FIG. 1) of the light guiding portion 25 on the front button surface side. The light emitting portion 4 is an end portion of the light guiding portion 25 on the front button surface side. The light guiding function and the light emitting function of the light guiding portion 25 will be described in detail later.

Further, the light guiding portion 25 includes the fitting portion 28 which is fitted to the cap body 11 of the button cap 10. The fitting portion 28 is a concave portion which is formed in the end portion of the light guiding portion 25 on the front button surface side in a depressed manner. The fitting portion 28 is formed by forming a step in the inner peripheral surface of the end portion of the light guiding portion 25 on the front button surface side. The inner diameter of the fitting portion 28 is substantially equal to the outer diameter of the cap body 11. When the cap body 11 is fitted to the fitting portion 28, a cylindrical outer peripheral wall 282 of the fitting portion 28 surrounds the outer periphery of the cap body 11. The end portion of the outer peripheral wall 282 of the fitting portion 28 on the front button surface side corresponds to the end portion of the light guiding portion 25 (light emitting portion 4) on the front button surface side. Further, an inner peripheral tapered surface 281 of the fitting portion 28 is formed as a tapered surface of which the diameter is reduced from the front button surface side toward the rear button surface side. For this reason, when the cap body 11 is fitted to the fitting portion 28, the inner peripheral tapered surface 281 of the fitting portion 28 comes into close contact with the outer peripheral surface 112 of the cap body 11 without any gap therebetween. Further, a concave portion 283 is formed at the first side of the fitting portion 28 in a depressed manner so as to be fitted to the locking protrusion 14 of the button cap 10.

The engagement portion 26 has a function of fixing the button cap 10 to the button base 20 by engaging with the button cap 10 fitted to the button base 20. The engagement portion 26 is provided in the hollow portion inside the cylindrical light guiding portion 25, and is disposed near the center of the front/rear direction of the button inside the hollow portion. The engagement portion 26 is formed in a cup shape protruding toward the front button surface, and includes a circular bottom portion 262 and a cylindrical outer peripheral wall 263 in the vicinity thereof. An outer peripheral edge 261 of the engagement portion 26 is an end portion of the outer peripheral wall 263 on the rear button surface side, and the outer peripheral edge 261 is bonded to the inner peripheral surface of the light guiding portion 25. In this way, the movable portion 21 has a double cylindrical structure having the cylindrical light guiding portion 25 and the outer peripheral wall 263 of the engagement portion 26.

Further, the insertion hole 50 is formed in the bottom portion 262 of the cup-shaped engagement portion 26 so as to have two arm portions 12 of the button cap 10 inserted thereinto. The insertion hole 50 is a rectangular penetration hole that penetrates the bottom portion 262 of the engagement portion 26 in the front/rear direction of the button. The arm portions 12 of the button cap 10 are inserted into the insertion hole 50. The engagement portion 26 fixes the button cap 10 to the button base 20 by engaging with the locking claws 13 of the arm portions 12 inserted into the insertion hole 50.

Furthermore, a rib 60 having a trigonal pyramid shape is formed in the inner surface of the rectangular insertion hole 50 in a protruding manner. The rib 60 has a function of assisting the operation of inserting the locking claws 13 into the insertion hole 50 and preventing the locking claws 13 from being separated from the insertion hole 50. The rib 60 will be described in detail later.

3. Fitting Structure Between Button Cap and Button Base

Figure 6:
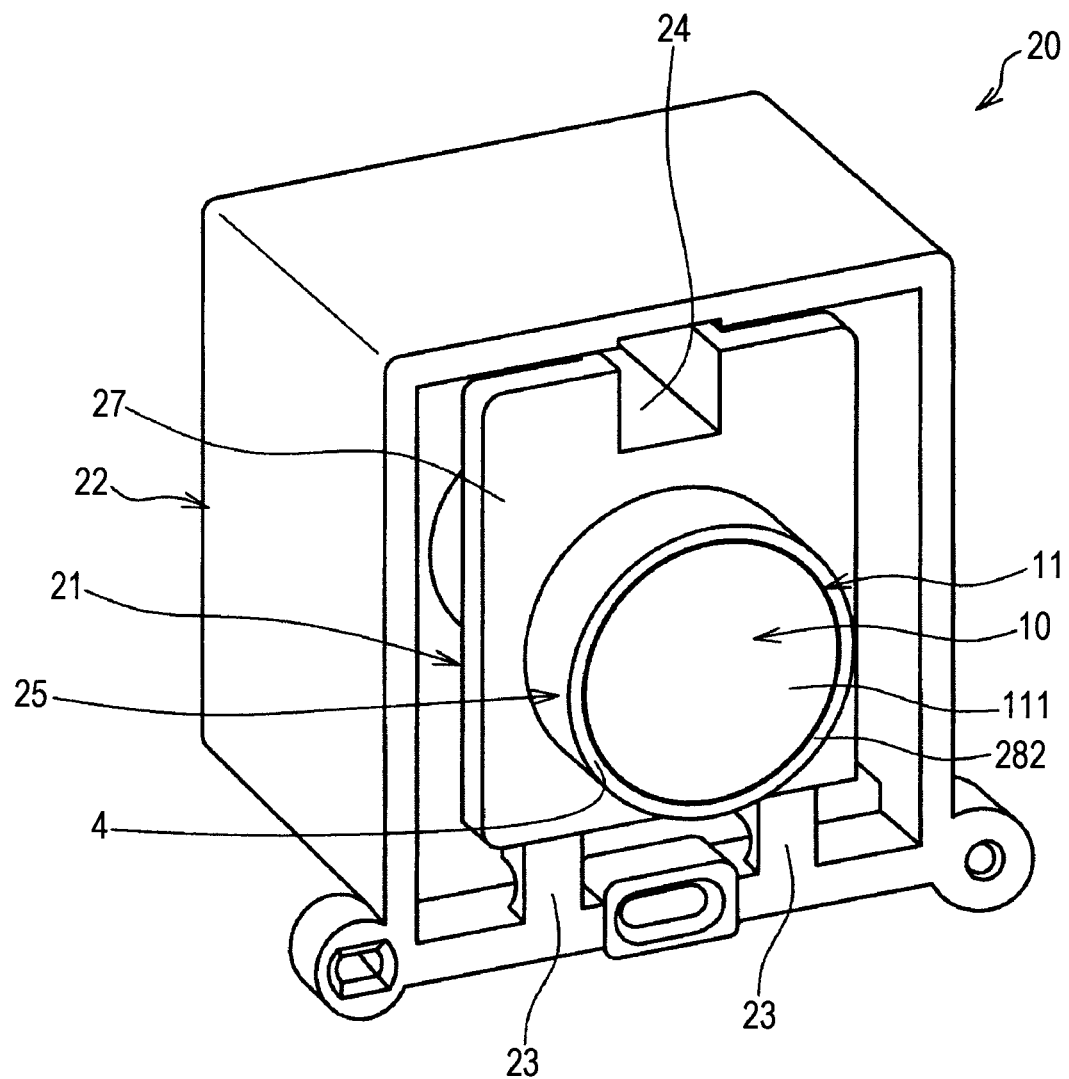
FIG. 6 is a perspective view illustrating the button base fitted to the button cap according to the embodiment.
Figure 7:
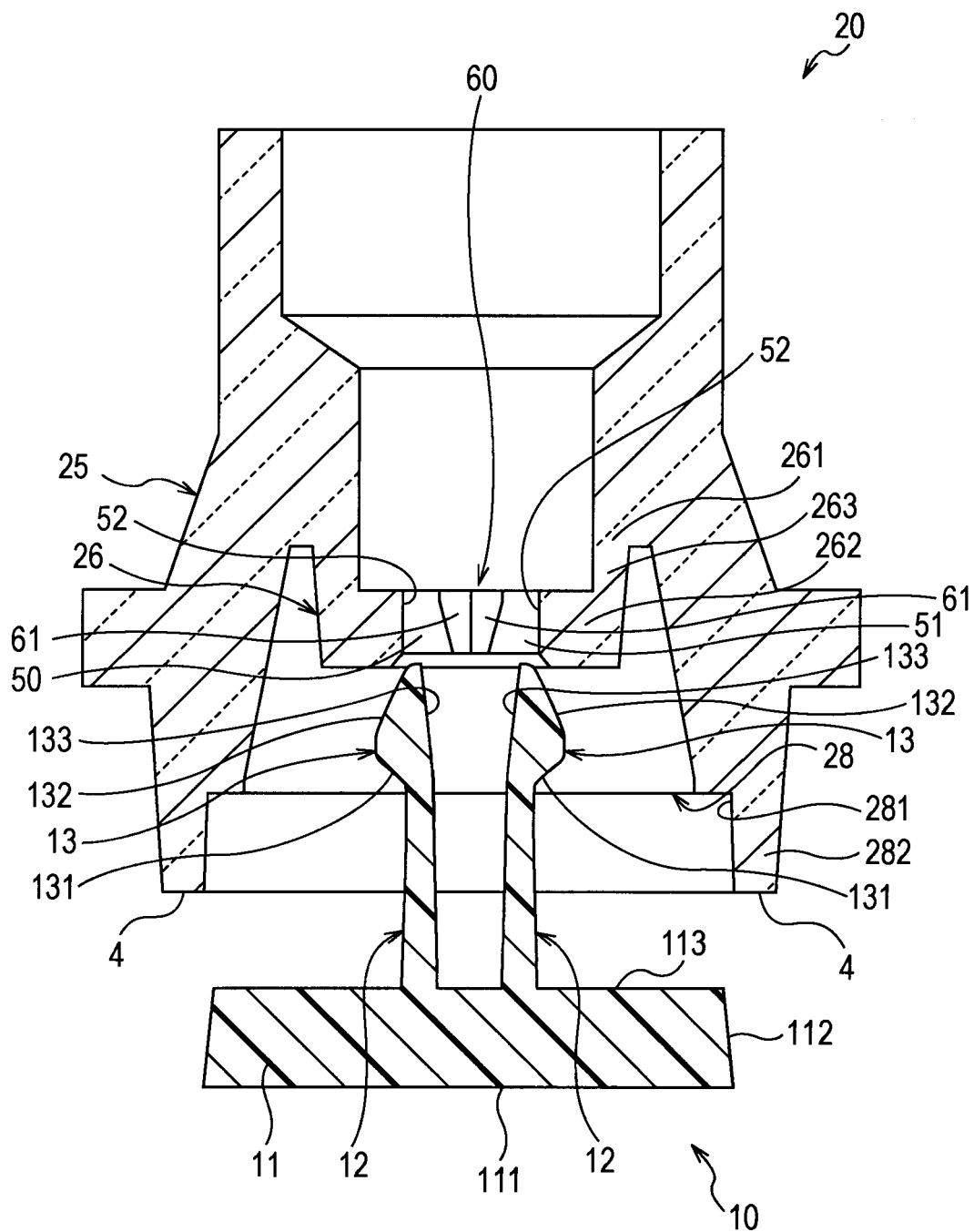
FIG. 7 is a horizontal cross-sectional view illustrating a state before the button cap and the button base according to the embodiment are fitted to each other.
Figure 8:
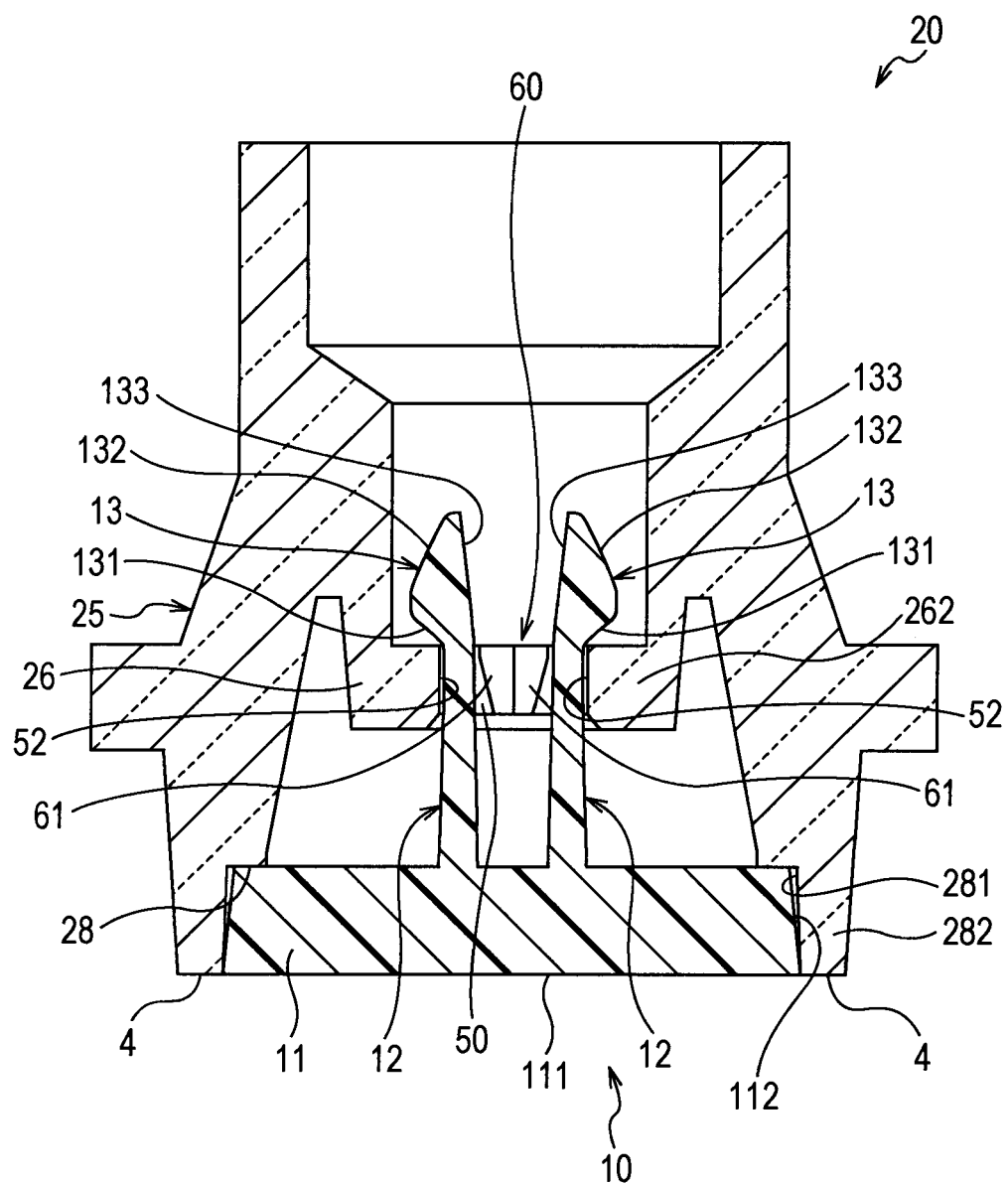
FIG. 8 is a horizontal cross-sectional view illustrating a state after the button cap and the button base according to the embodiment are fitted to each other.

Next, a fitting structure of the button cap 10 and the button base 20 will be described in detail by referring to FIGS. 5 to 8. Further, FIG. 6 is a perspective view illustrating the button base 20 fitted to the button cap 10 according to the embodiment. FIGS. 7 and 8 are horizontal cross-sectional views illustrating states before and after the button cap 10 and the button base 20 according to the embodiment are fitted to each other.

FIGS. 5 and 7 illustrate a state before the button cap 10 is fitted to the button base 20, and FIGS. 6 and 8 illustrate a state after the button cap 10 is fitted to the button base 20. As shown in FIGS. 5 to 8, the button cap 10 is fitted to the button base 20 from the front surface of the button base 20. At this time, the cap body 11 of the button cap 10 is fitted to the fitting portion 28 formed in the end portion of the cylindrical light guiding portion 25 of the button base 20 on the front button surface side, and the arm portions 12 of the button cap 10 are inserted into the insertion hole 50 formed in the engagement portion 26 of the button base 20.

As shown in FIGS. 6 and 8, the cylindrical outer peripheral wall 282 of the fitting portion 28 is disposed so as to surround the periphery of the cap body 11 when the cap body 11 is fitted to the fitting portion 28. Then, the front surface 111 of the cap body 11 is located at the same level in the height with the end surface of the light guiding portion 25 of the button base 20 on the front button surface side (that is, the end surface of the outer peripheral wall 282 of the fitting portion 28). In this way, the annular light emitting portion 4 may be disposed in the periphery of the cap body 11 in such a manner that the outer periphery of the cap body 11 of the button cap 10 is surrounded by the light guiding portion 25 of the button base 20.

Further, as shown in FIG. 8, the locking claws 13 engage with the engagement portion 26 in the periphery of the insertion hole 50 after the locking claws 13 of the front ends of the arm portions 12 are inserted into the insertion hole 50. At this time, both locking surfaces 131 of the locking claws 13 come into contact with the rear surface portion of the engagement portion 26 present in the periphery of the insertion hole 50, and the locking claws 13 lock the engagement portion 26. Accordingly, the arm portions 12 is not separated from the insertion hole 50. In this way, the button cap 10 is fixed to the button base 20 since the locking claws 13 inserted into the insertion hole 50 lock the engagement portion 26 of the button base 20 when the button cap 10 is fitted to the button base 20.

Figure 9:
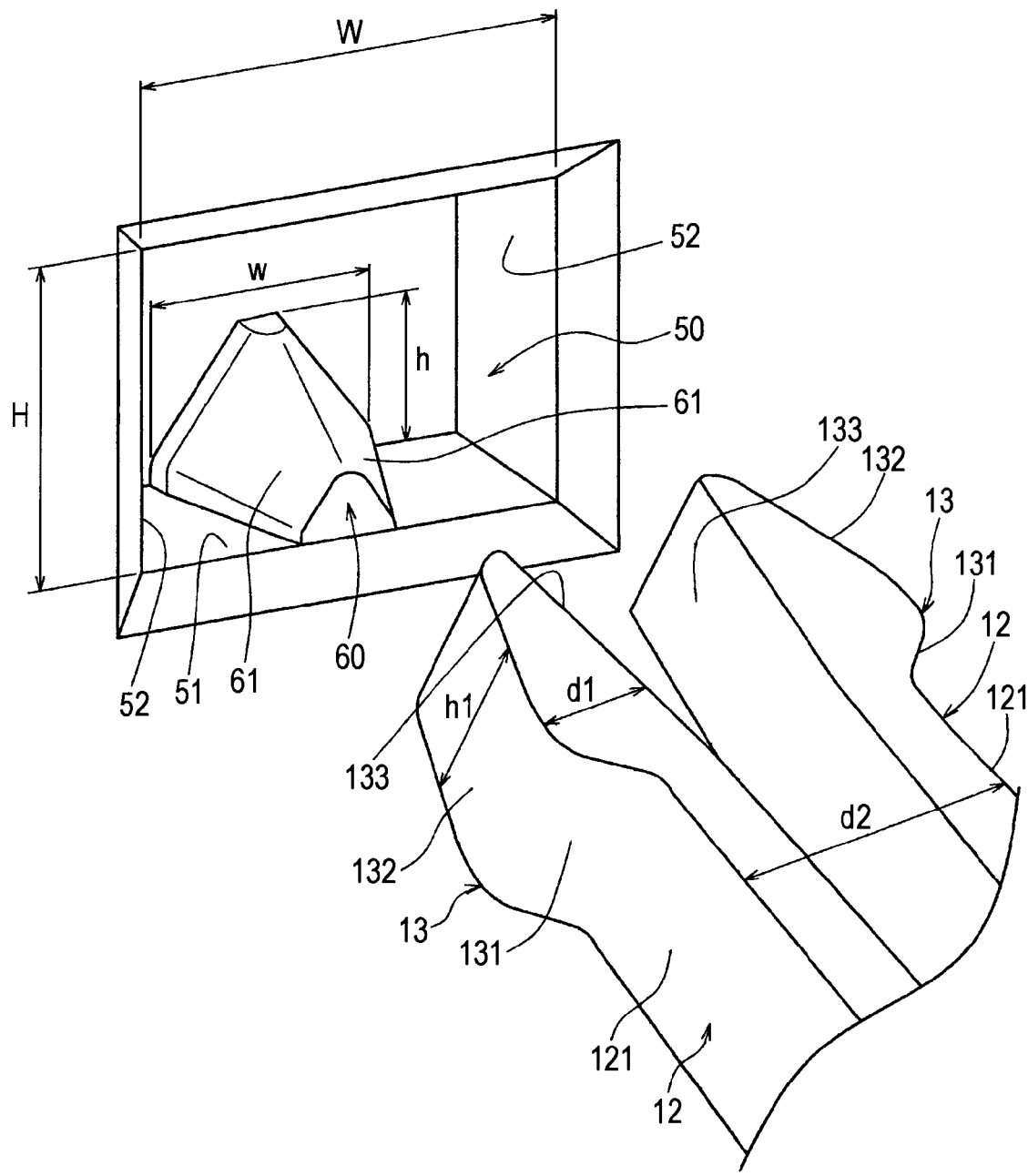
FIG. 9 is a perspective view illustrating a locking claw and an insertion hole with a rib having a trigonal pyramid shape according to the embodiment.
Figure 10:
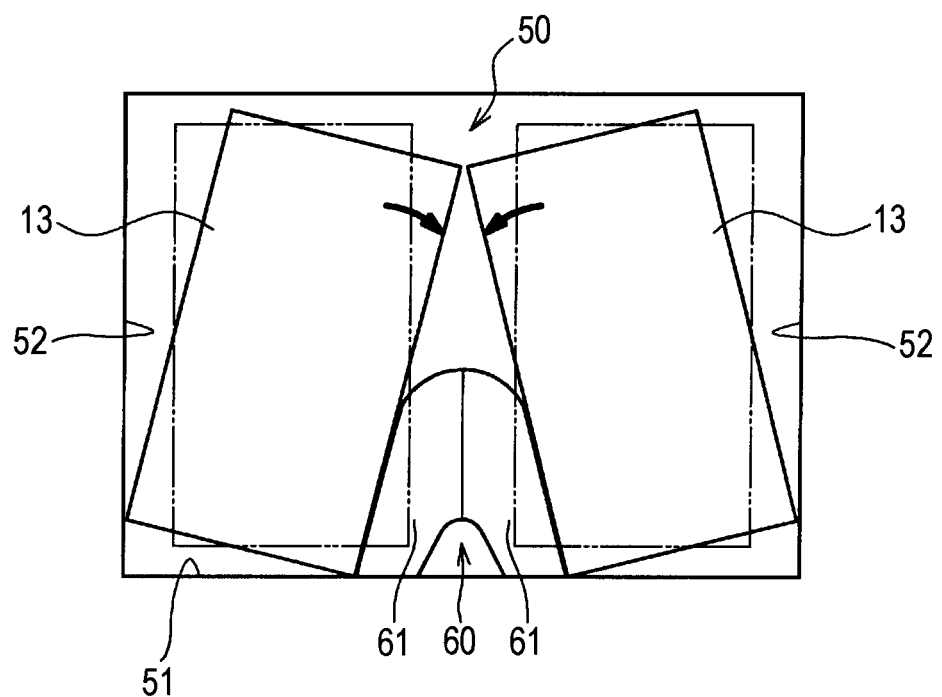
FIG. 10 is a schematic view illustrating a state where the locking claw inserted into the insertion hole according to the embodiment is twisted by the rib.

Next, a method will be described which inserts the locking claws 13 into the insertion hole 50 using the rib 60 having a trigonal pyramid shape and formed in the insertion hole 50 according to the embodiment. Further, FIG. 9 is a perspective view illustrating the locking claws 13 and the insertion hole 50 provided with the rib 60 having a trigonal pyramid shape according to the embodiment by referring to FIGS. 7 to 10. FIG. 10 is a schematic view illustrating a state where the locking claws 13 inserted into the insertion hole 50 according to the embodiment are twisted by the rib 60.

As shown in FIGS. 7 to 9, the insertion hole 50 is an opening (having a width W and a height H) having a rectangular longitudinal section, and has the width W and the height H allowing the pair of locking claws 13 to be inserted into the insertion hole at the same time. The locking claws 13 may be inserted into the insertion hole 50 since the height H of the insertion hole 50 is larger than the height h1 of the locking claw 13 (for example, H=2.2 mm, h1=1.7 mm). Further, the width W of the insertion hole 50 is adjusted to be a width allowing the pair of locking claws 13 to be inserted into the insertion hole 50 at the same time and preventing the locking claws 13 inserted into the insertion hole 50 from being easily separated therefrom. Specifically, the width W of the insertion hole 50 is slightly larger than twice the maximum thickness d1 of the locking claw 13 (W>2×d1), and the width W of the insertion hole 50 is equal to or slightly larger than the width d2 between the outer surfaces 121 of the pair of arm portions 12 (W≧d2) so that the locking claws 13 may sufficiently lock the engagement portion 26. For example, W=3.2 mm, d1=1.2 mm, and d2=2.8 mm. Accordingly, the pair of locking claws 13 may be inserted into the insertion hole 50 at the same time, and the locking claws 13 may appropriately lock the outer portion of the insertion hole 50 in the width direction, so that the pair of arm portions 12 inserted into the insertion hole 50 is not separated therefrom.

Further, the rib 60 having a trigonal pyramid shape and disposed inside the insertion hole 50 will be described. As shown in FIGS. 7 to 9, the rib 60 having a trigonal pyramid shape is formed at the center portion of one inner surface 51 of the insertion hole 50 in a protruding manner. The rib 60 having a trigonal pyramid shape has a function of easily inserting the pair of locking claws 13 into the insertion hole 50 by rotating the pair of locking claws to be twisted in an inverted v shape when the pair of locking claws 13 is inserted into the insertion hole 50.

The rib 60 having a trigonal pyramid shape has a bilaterally symmetrical shape with respect to the normal line penetrating the center of the insertion hole 50. The maximum width w of the rib 60 is approximately about a half of the width W of the insertion hole 50, and the height h of the rib 60 is approximately about a half of the height H of the insertion hole 50. Further, each side or apex of the rib 60 and the edge of the insertion hole 50 are chamfered in order to prevent the rib 60 or the locking claw 13 from being broken.

The rib 60 having a trigonal pyramid shape includes a pair of inclined surfaces 61 suitable for the front button surface side as shown in FIG. 9. Each of the pair of inclined surfaces 61 is disposed at a position corresponding to each of the pair of locking claws 13 of the button cap 10. The pair of inclined surfaces 61 is disposed so as to be bilaterally symmetrical to each other, and each inclined surface 61 is inclined in a direction inclined by a predetermined angle outward with respect to the direction facing the front button surface. In this way, the inclined surfaces 61 are inclined by a predetermined angle with respect to the insertion direction (that is, the front/rear direction of the button) of the locking claws 13, and the width of the rib 60 becomes widened as it goes to the inside of the insertion hole 50 (in the direction facing the rear button surface).

As shown in FIGS. 7 and 9, the outer surfaces 132 of the front ends of the locking claws 13 respectively come into contact with the left and right side surfaces 52 of the insertion hole 50 when the pair of locking claws 13 is inserted into the insertion hole 50. For this reason, the locking claws 13 are bent inward so as to move close to each other in the width direction of the insertion hole 50. Further, as shown in FIG. 10, the pair of locking claws 13 is twisted so that the longitudinal section thereof is formed in an inverted v shape along the inclined surfaces 61 since the pair of locking claws 13 respectively comes into contact with the pair of inclined surfaces 61 of the rib 60 inside the insertion hole 50.

That is, the front ends of the arm portions 12 may be more easily bent than the bases thereof when the arm portions 12 of the button cap 10 are inserted into the insertion hole 50 of the button base 20. Accordingly, the locking claws 13 of the front ends of the arm portions 12 are bent in an inverted v shape by the rib 60 having a trigonal pyramid shape while being bent inward so as to move close to each other when the arm portions 12 are inserted into the insertion hole 50. Subsequently, the rib 60 is interposed between the arm portions 12 of the bases of the locking claws 13 after the locking claws 13 are completely inserted into the insertion hole 50 as shown in FIG. 8. Accordingly, the arm portions 12 are hardly bent inward since the arm portions 12 come into contact with the rib 60 serving as a spacer. Therefore, the locking claws 13 may be prevented from being separated from the insertion hole 50 by the rib 60.

Figure 11A:
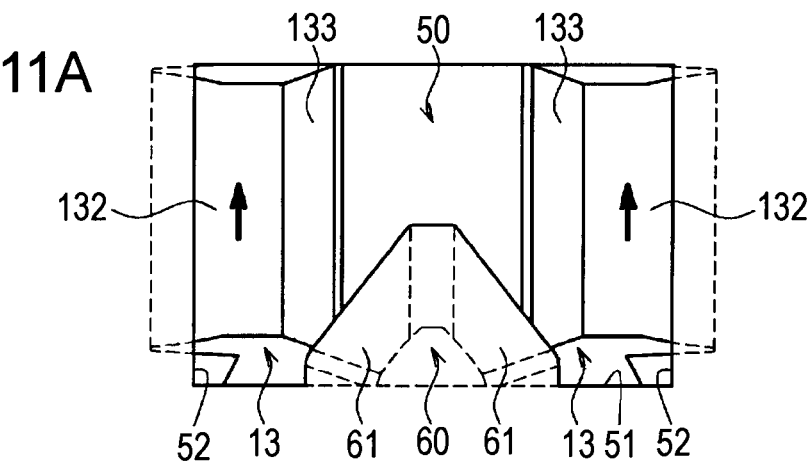
FIGS. 11A to 11C are state transition diagrams illustrating a deformation state of the locking claw inserted into the insertion hole according to the embodiment.
Figure 11B:
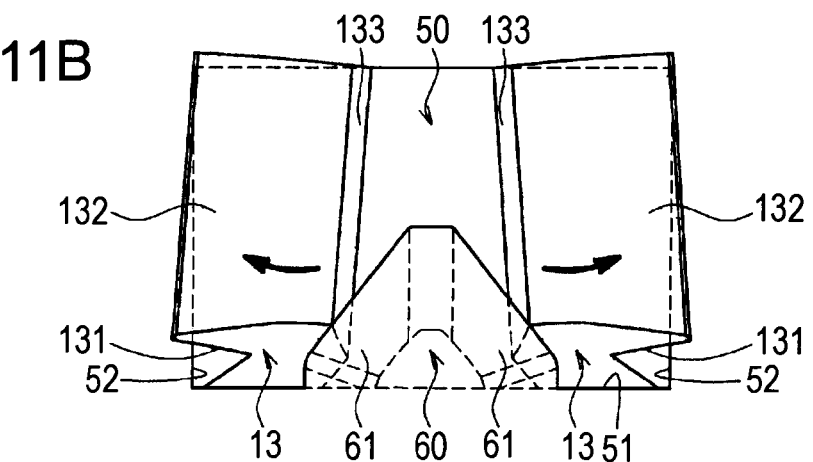
Figure 11C:
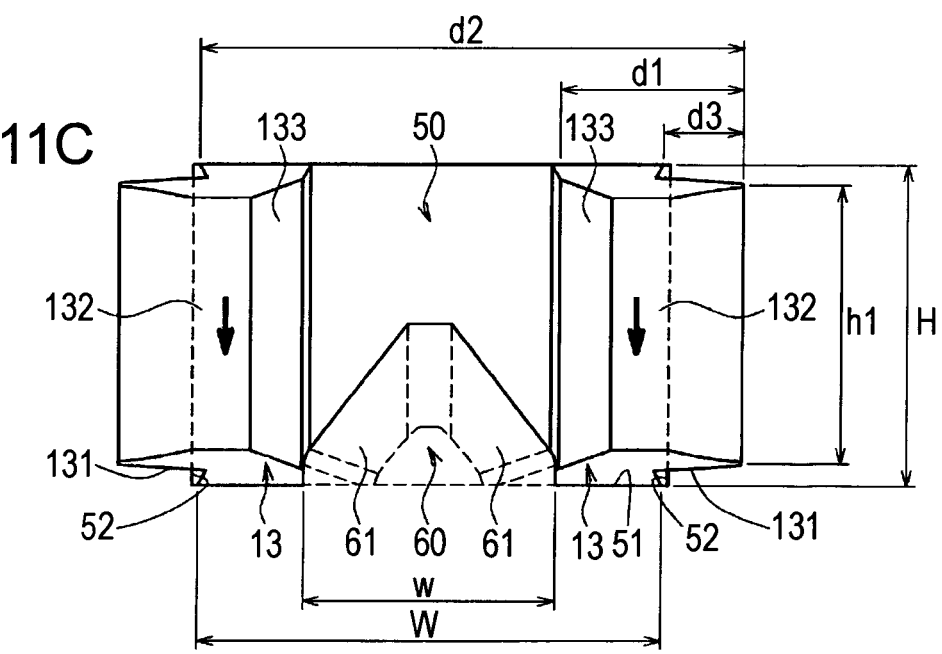

Here, a deformation operation of the locking claws 13 when inserting the locking claws 13 into the insertion hole 50 will be described in detail by referring to FIGS. 11A to 11C. FIGS. 11A to 11C are state transition diagrams illustrating a deformation state of the locking claws 13 inserted into the insertion hole 50 according to the embodiment, where FIG. 11A illustrates a state where an insertion operation starts, FIG. 11B illustrates a state where an engagement operation starts, and FIG. 11C illustrates a state where the engagement operation is completed. Further, FIGS. 11A to 11C are diagrams illustrating the locking claws 13 inserted into the insertion hole 50 when seen from the rear surface side (rear button surface side) of the insertion hole 50.

The locking claws 13 start to be inserted along the left and right side surfaces 52 of the insertion hole 50 and the inclined surfaces 61 of the rib 60 having a trigonal pyramid shape when the locking claws 13 of the button cap 10 start to be inserted into the insertion hole 50 of the button base 20 as shown in FIG. 11A. At this time, the outer surfaces 132 of the front ends of the locking claws 13 respectively come into contact with both side surfaces 52 of the insertion hole 50, and the inner surfaces 133 of the front ends of the locking claws 13 respectively come into contact with the inclined surfaces 61 of the rib 60. Accordingly, the locking claws 13 enter the insertion hole 50 while being bent inward and upward. In accordance with the advancing action, the lower ends of the locking claws 13 are widened by the inclined surfaces 61 of the rib 60, and the upper ends of the locking claws 13 move close to each other. Accordingly, the locking claws 13 are twisted in an overall inverted v shape.

Subsequently, the locking claws 13 are maximally bent in an inverted v shape when the locking claws 13 start to engage with the periphery of the insertion hole 50 as the maximum thickness portions of the locking claws 13 pass through the insertion hole 50 as shown in FIG. 11B. That is, the locking claws 13 is largely twisted in an inverted v shape since the inner surfaces 133 of the maximum thickness portions of the locking claws 13 come into contact with the maximum width portions of the inclined surfaces 61 of the rib 60. In this way, the locking surfaces 131 of the locking claws 13 start to engage with the peripheral portion of the insertion hole 50 (the bottom portion 262 of the engagement portion 26) when the maximum thickness portions of the locking claws 13 pass through the insertion hole 50 while being largely twisted in an inverted v shape.

Subsequently, the pair of locking claws 13 return from the twisted state to the parallel state and return to the center position in the vertical direction inside the insertion hole 50 when the locking claws 13 pass through the insertion hole 50 as shown in FIG. 11C. As a result, the locking claws 13 are completely locked by completely engaging with the peripheral portion of the insertion hole 50 (the engagement portion 26 of the button base 20). At this time, the locking claws 13 are regulated from being bent inward so as to move close to each other by the rib 60 since the rib 60 is interposed between the bases of two locking claws 13. Accordingly, the locking claws 13 is difficult to separate from the insertion hole 50, and the button cap 10 and the button base 20 may be reliably fitted to each other.

Further, FIG. 11C illustrates an example of the dimensions of the respective parts of the insertion hole 50, the arm portion 12, and the locking claw 13 according to the embodiment. The width W of the insertion hole 50 is 3.2 mm, the height H of the insertion hole 50 is 2.2 mm, the maximum thickness d1 of the locking claw 13 is 1.2 mm, the width d2 between the outer surfaces 121 of the arm portions 12 is 2.8 mm, and the locking width d3 of the locking claw 13 is 0.6 mm. However, these dimensions are merely examples, and the invention is not limited to the exemplary dimensions shown in the drawing.

As described above, according to the fitting structure between the button cap 10 and the button base 20 of the embodiment, the rib 60 having a trigonal pyramid shape is provided inside the insertion hole 50. Accordingly, the locking claws 13 may be easily and smoothly inserted into the insertion hole 50 since the locking claws 13 are bent and twisted in an inverted v shape by the rib 60 when the locking claws 13 of the button cap 10 are inserted into the insertion hole 50 of the button base 20. In this way, the locking claws 13 may be easily inserted into the insertion hole 50 by a weak inserting pressure using the principle that the locking claws 13 are bent by the rib 60 at the time of inserting the locking claws into the insertion hole.

Further, the locking claws 13 are difficult to separate from the insertion hole 50 since the rib 60 interposed between the locking claws 13 may regulate the locking claws 13 from being bent inward after the engagement of the locking claws 13. Accordingly, the locking claws 13 may be prevented from being separated from the insertion hole 50 since the engagement between the insertion hole 50 and the locking claws 13 may be maintained by the rib 60 even when there is a force acting to separate the locking claws 13 from the insertion hole 50.

4. Light Emitting Structure Around Button

Figure 12:
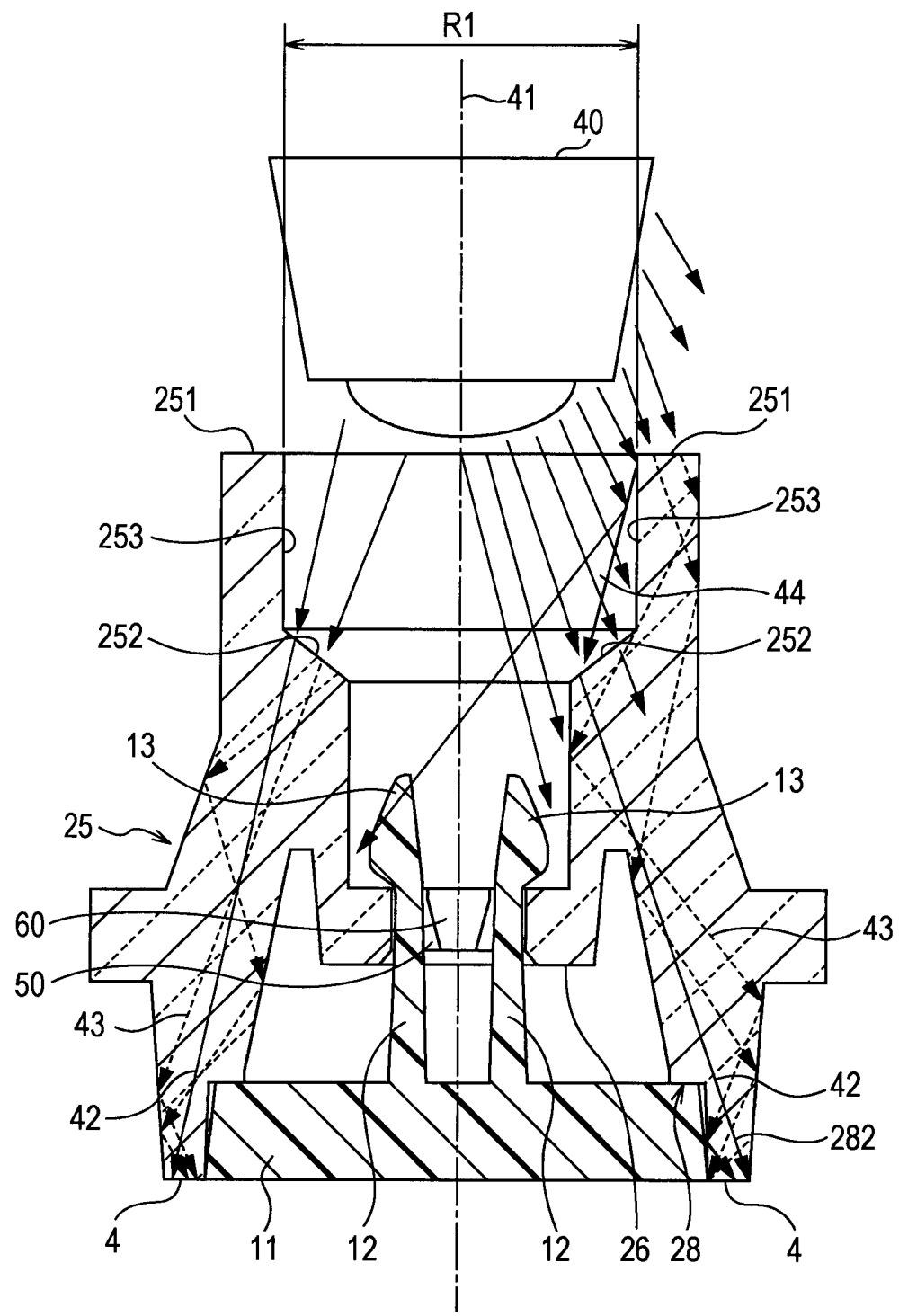
FIG. 12 is a horizontal cross-sectional view illustrating a light guiding portion of the button base according to the embodiment.

Next, the light emitting structure illuminating the periphery of the button in the operation button 2 of the above-described fitting structure will be described in detail by referring to FIG. 12. FIG. 12 is a horizontal cross-sectional view illustrating a light guiding portion 25 of the button base 20 according to the embodiment.

As shown in FIG. 12, the button base 20 includes the cylindrical light guiding portion 25 extending in the front/rear direction of the button, and the light emitting element 40 such as a light emitting diode (LED) is disposed on the rear button surface side of the light guiding portion 25. The light guiding portion 25 is integrally molded from, for example, a milky white transmissive material, and the light is transmitted through the inside of the light guiding portion 25. Further, the disc-shaped cap body 11 of the button cap 10 is fitted to the fitting portion 28 of the light guiding portion 25 on the front button surface side. The outer periphery of the cap body 11 is surrounded by the cylindrical outer peripheral wall 282 of the fitting portion 28, and the end portion of the outer peripheral wall 282 on the front button surface side forms the annular light emitting portion 4.

The center of the cap body 11 and the center of the light guiding portion 25 are disposed on the optical axis 41 of the light emitting element 40. In other words, the cap body 11, the light guiding portion 25, and the light emitting element 40 are disposed on the same central axis. With such an arrangement, the light emitted from the light emitting element 40 is transmitted through the inside of the light guiding portion 25 so as to be uniform in the circumferential direction, and reaches the annular light emitting portion 4 in the periphery of the cap body 11. Therefore, the irregularity in the light emission of the light emitting portion 4 may be prevented.

Here, a light guiding function of the light guiding portion 25 will be described in detail. As shown in FIG. 12, the light emitting element 40 is disposed on the rear surface side of the light guiding portion 25 so as to face the front button surface. When the light emitting element 40 emits light, the light emitted from the light emitting element 40 advances in a radial shape in the direction facing the front button surface. A part of the light enters the light guiding portion 25 from a light incident surface 252 formed in the inner peripheral surface 253 of the light guiding portion 25 or an end surface 251 of the light guiding portion 25 on the rear button surface side, and reaches the light emitting portion 4 of the front surface of the light guiding portion 25 as direct light 42 or indirect light 43. Here, the direct light 42 is light that advances linearly without any reflection in the path from the light emitting element 40 to the light emitting portion 4, and the indirect light 43 is light that undergoes reflection in the course of the path. The direct light 42 is brighter than the indirect light 43, and is uniformly emitted from the light emitting portion 4.

Therefore, the light guiding portion 25 may guide the larger amount of direct light 42 to the light emitting portion 4 of the front surface by setting the diameter R1 of the light guiding portion 25 as small as possible so that the light guiding portion 25 directly receives the light emitted from the light emitting element 40. Further, the light emitted from the light emitting element 40 may be appropriately incident into the light guiding portion 25, and the larger amount of directly light 42 may be guided to the light emitting portion 4 by forming the tapered light incident surface 252 in the inner peripheral surface 253 of the light guiding portion 25 (refer to FIG. 12).

Further, most of diffused light 44 emitted from the light emitting element 40 may be incident into the light guiding portion 25 and be guided to the light emitting portion 4 since the light guiding portion 25 is formed of a milky white transmissive material. As described above, the light emitting portion 4 may uniformly emit the light in an annular shape without any irregularity in the light emission since the light guiding portion 25 according to the embodiment has a structure in which each of the direct light 42, the indirect light 43, and the diffused light 44 is guided to the light emitting portion 4 of the front button surface.

Furthermore, the light guiding portion 25 may guide a larger amount of light to the light emitting portion 4 by disposing the fitting structure between the button base 20 and the button cap 10 at the center of the button device to be compact in size. Therefore, the embodiment adopts the fitting structure including the locking claws 13 and the insertion hole 50, and the button cap 10 is fixed to the narrow range at the center inside the light guiding portion 25. Accordingly, the larger amount of light emitted from the light emitting element 40 may be guided to the light emitting portion 4 through the light guiding portion 25 since the light guiding function of the light guiding portion 25 is not disturbed by the fitting structure according to the embodiment. Due to such reasons, it is thought that the shape of the fitting structure according to the embodiment is optimal from the viewpoint of the attachability of the button cap 10, the light emitting performance of the light emitting portion 4, and the like.

Figure 13:
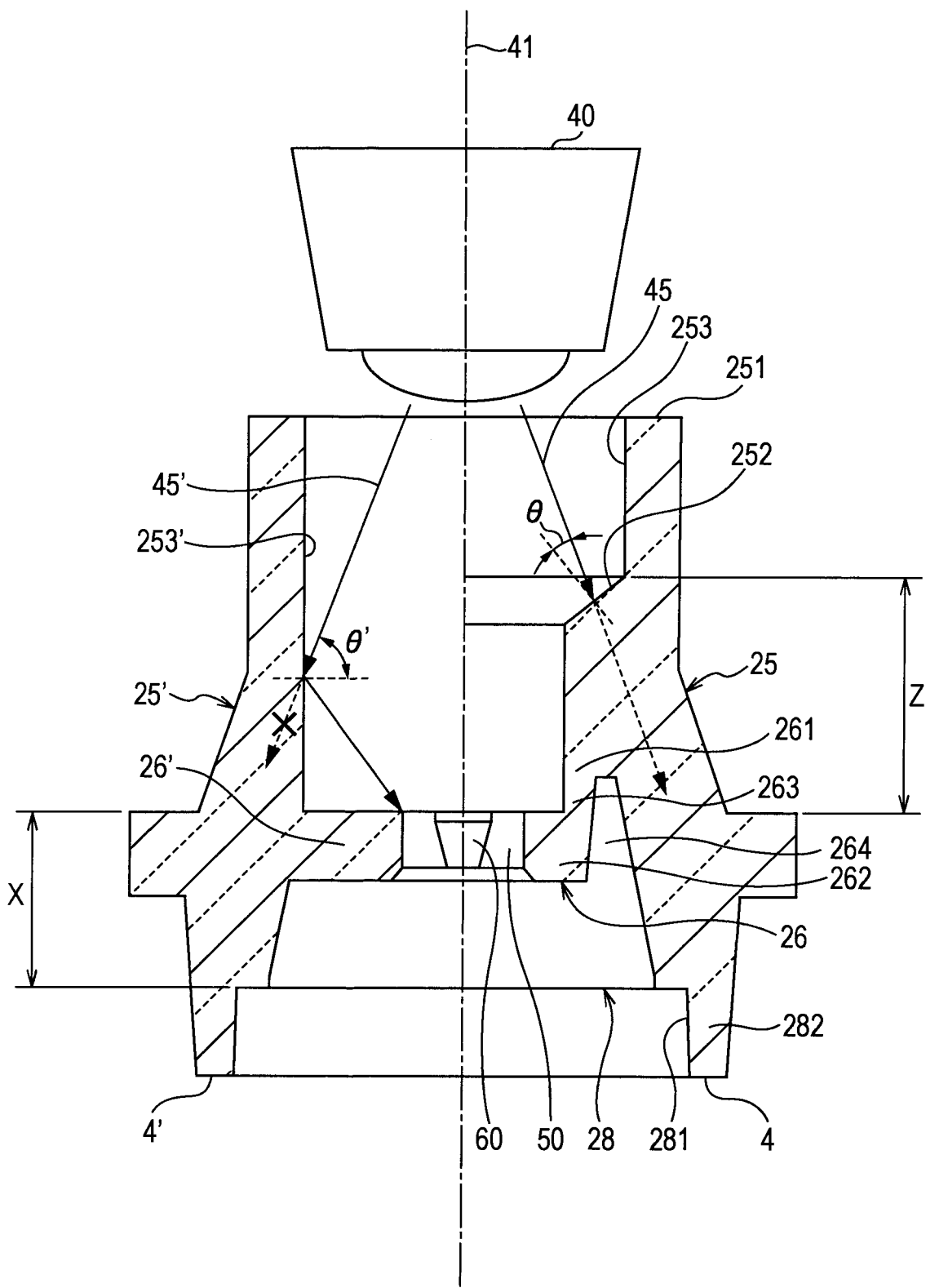
FIG. 13 is a horizontal cross-sectional view illustrating the light guiding portion according to the embodiment (right cross-section in the drawing) and the light guiding portion (left cross-section in the drawing) according to a first comparative example.

Next, a shape and light guiding characteristics of the light guiding portion 25 according to the embodiment will be described in more detail by referring to FIG. 13. FIG. 13 is a horizontal cross-sectional view illustrating the light guiding portion 25 according to the embodiment (right cross-section in the drawing) and a light guiding portion 25' (left cross-section in the drawing) according to a first comparative example. Further, even in the embodiment and the first comparative example, it is assumed that the engagement position between the engagement portions 26 and 26' and the locking claws of the button cap 10 is the distance X from the bottom surface of the fitting portion 28 to the rear button surface side, and both engagement positions are the same.

As shown in the left cross-section of FIG. 13, the engagement portion 26' according to the first comparative example is a flat plate shape projecting from the inner peripheral surface of the light guiding portion 25' in the perpendicular direction. Further, an inner peripheral surface 253' of the light guiding portion 25' is a simple cylindrical surface linearly extending from the engagement portion 26' in the direction facing the rear button surface, and does not have a step. In the structure of the light guiding portion 25' and the engagement portion 26' according to the first comparative example, direct light 45' emitted from the light emitting element 40 does not enter the light guiding portion 25' since the direct light is reflected by the inner peripheral surface 253' of the light guiding portion 25'. This is because an incident angle θ' of the light 45' with respect to the inner peripheral surface 253' is equal to or larger than a critical angle α. Further, the critical angle α is determined depending on the material of the light incident surface or the characteristics of the light, and the light incident at the incident angle θ' equal to or larger than the critical angle α is reflected by the light incident surface without being transmitted through the light incident surface.

On the contrary, the tapered light incident surface 252 (corresponding to the tapered step of which the diameter is reduced toward the front button surface) is formed in the inner peripheral surface 253 of the light guiding portion 25 according to the embodiment as shown in the left cross-section of FIG. 13. The light incident surface 252 is a tapered surface of which the diameter is reduced from the rear button surface to the front button surface, and is formed at the substantially center portion between the engagement portion 26 and the end surface 251 of the light guiding portion 25. The light incident surface 252 faces the light emitting element 40, and the direct light 45 emitted from the light emitting element 40 toward the light incident surface 252 is incident to the light incident surface 252 at the incident angle θ. The positional relationship between the light emitting element 40 and the light guiding portion 25 or the disposition (the direction, the size, and the like) of the light incident surface 252 is adjusted so that the incident angle θ in the light incident surface 252 is less than the critical angle α. Accordingly, since the direct light 45 emitted from the light emitting element 40 is incident to the light incident surface 252 at the incident angle θ less than the critical angle α, the direct light enters the light guiding portion 25 while being transmitted through the light incident surface 252, and advances toward the light emitting portion 4 of the light guiding portion 25 on the front button surface side. Therefore, since the tapered light incident surface 252 is formed in the inner peripheral surface 253 of the light guiding portion 25, the entrance of the direct light 45 emitted from the light emitting element 40 to the light guiding portion 25 may be promoted, and the direct light 45 may be guided to the light emitting portion 4.

Further, the portion (the range indicated by the distance Z of FIG. 13) from the light incident surface 252 of the light guiding portion 25 to the engagement portion 26 has a shape in which the light incident to the light guiding portion 25 is incident to or reflected from the light emitting portion 4 on the front button surface side. Specifically, the engagement portion 26 formed inside the light guiding portion 25 has a cup shape that protrudes toward the front button surface, and an annular gap 264 is present between the light guiding portion 25 and the outer peripheral wall 263 of the engagement portion 26. In this way, the light guiding portion 25 and the outer peripheral wall 263 of the engagement portion 26 form a double cylindrical structure.

In the structure of the first comparative example, the light incident to the light guiding portion 25' enters the engagement portion 26' and is reflected, so that the light does not advance toward the light emitting portion 4' in many cases. On the contrary, according to the embodiment, the light incident to the light guiding portion 25 may be guided toward the light emitting portion 4 on the front button surface as much as possible without making the light advance toward the engagement portion 26 by using the double cylindrical structure of the light guiding portion 25 and the engagement portion 26. Accordingly, the light emitting portion 4 may uniformly emit light by increasing the amount of light reaching the light emitting portion 4 since most of the light incident to the light guiding portion 25 advances toward the light emitting portion 4 on the front button surface.

As described above, the light emitting structure and the fitting structure of the button base 20 according to the embodiment have been described by referring to FIGS. 12 and 13. According to the embodiment, the larger amount of light emitted from the light emitting element 40 provided on the rear button surface side may be incident to the cylindrical light guiding portion 25 through the light incident surface 252, and the incident light may be guided to the light emitting portion 4 through the light guiding portion 25. Accordingly, the light emitting portion 4 in the periphery of the button cap 10 may uniformly emit light in an annular shape without any irregularity in the light emission. Further, a structure may be provided which is capable of simultaneously satisfying the fixing operation of the locking claws 13 and the light guiding operation to the light emitting portion 4 by using the double cylindrical structure of the light guiding portion 25 and the engagement portion 26.

Here, the fitting structures according to the second and third comparative examples and the problems thereof will be described for the comparison with the fitting structure of the button base 20 according to the embodiment.

Figure 14:
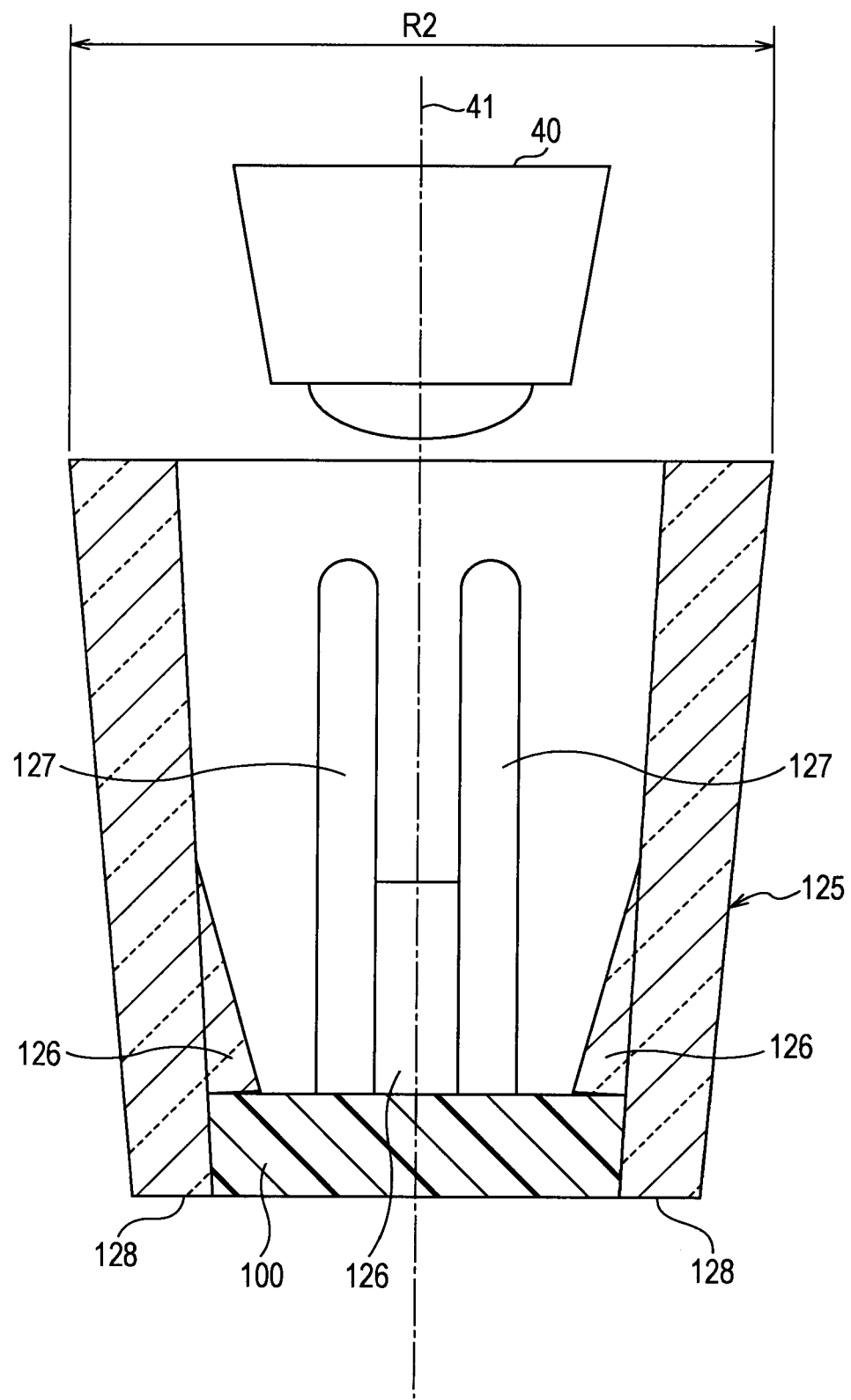
FIG. 14 is a horizontal cross-sectional view illustrating a fitting structure of the light guiding portion of the button base according to a second comparative example.

FIG. 14 is a horizontal cross-sectional view illustrating a fitting structure of a light guiding portion 125 of the button base according to the second comparative example. As shown in FIG. 14, the second comparative example has a structure in which a disc-shaped button cap 100 is inserted into the cylindrical light guiding portion 125 from the rear button surface side, and the outer peripheral portion of the button cap 100 is locked by claws 126 on the front button surface side of the light guiding portion 125. Four claws 126 are formed in the light guiding portion 125 in the circumferential direction, and a slit 127 is formed on both sides of each claw 126 so as to bend the claw 126. Accordingly, the locking claws 126 may be bent in the radial direction when the button cap 100 is fitted into the light guiding portion 125.

However, in the structure of the second comparative example, it is necessary to make the diameter R2 of the end portion of the rear surface side of the light guiding portion 125 large so that the button cap 100 may be inserted from the rear surface of the light guiding portion 125. Accordingly, the light emitted from the light emitting element 40 hardly enters the light guiding portion 125, and the light is barely transmitted through the inside of the light guiding portion 125. Therefore, the light emitting portion 128 on the front button surface side may not uniformly emit light, and the amount of the light emitted therefrom is small. Further, the slit 127 formed in the light guiding portion 125 disturbs the light guiding operation inside the light guiding portion 125. Therefore, the light emission of the light emitting portion 128 becomes irregular, so that the light emitting portion 128 does not uniformly emit the light.

Figure 15:
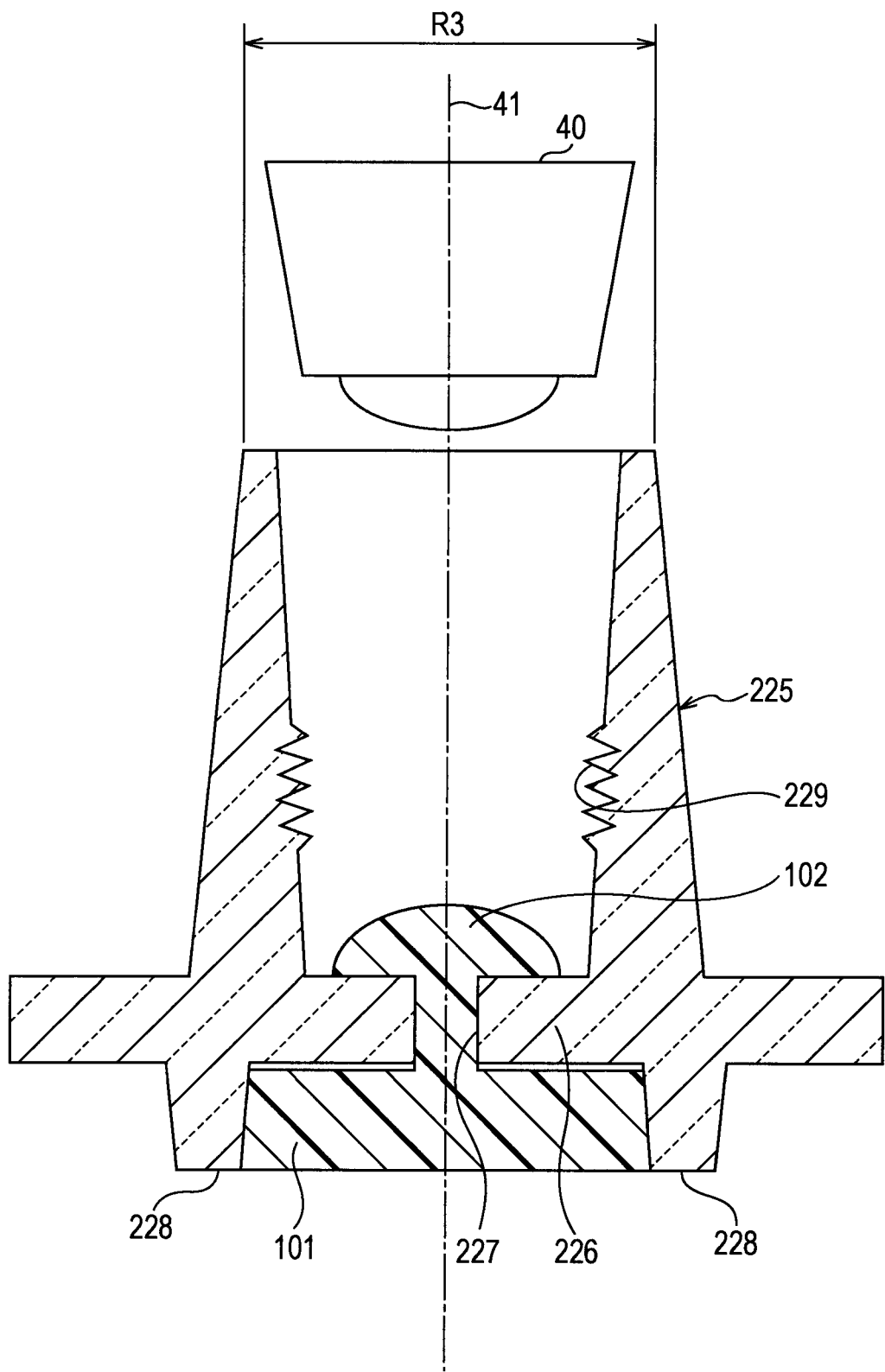
FIG. 15 is a horizontal cross-sectional view illustrating a fitting structure of the light guiding portion of the button base according to a third comparative example.

Further, FIG. 15 is a horizontal cross-sectional view illustrating a fitting structure of a light guiding portion 225 of the button base according to the third comparative example. As shown in FIG. 15, the third comparative example has a structure in which a button cap 101 is attached from the front surface side of the cylindrical light guiding portion 225, and heat-welding is performed on the rear surface side thereof. The button cap 101 is attached to an attachment portion 226 provided on the front surface side of the light guiding portion 225, a welding portion 102 of the button cap 101 is made protrude to the rear surface side while penetrating a hole 227 formed in the attachment portion 226, and then the welding portion 102 is heat-welded to the inside of the light guiding portion 225.

However, in the structure of the third comparative example, it is necessary to make the diameter R3 of the end portion of the rear surface side of the light guiding portion 225 large so that a welding iron is inserted from the rear surface side of the light guiding portion 125, and it is necessary to make the diameter R3 larger than the diameter of the semi-circular welding portion of the welding portion 102. Accordingly, the amount of the light emitted from the light emitting portion 228 is not sufficient since the light emitted from the light emitting element 40 is hardly incident to the light guiding portion 225. Further, since the heat-welding space inside the light guiding portion 225 is narrow, the inner peripheral surface 229 of the light guiding portion 225 may be contaminated due to the cobwebbing of the heat-welding substance or the melting of the inner peripheral surface 229 of the light guiding portion 225 in the welding operation. Since the breakage or the contamination of the inner peripheral surface 229 of the light guiding portion 225 disturbs the light guiding operation inside the light guiding portion 225, the light emission of the light emitting portion 228 becomes irregular, so that the light emitting portion 228 may not uniformly emit the light.

As described above, the problems of the structures of the second and third comparative examples have been described by referring to FIGS. 14 and 15. In the structures of the second and third comparative examples, the light emitting portions 128 and 228 may not uniformly emit light since the light guiding portions 125 and 225 may not sufficiently exhibit the light guiding function. On the contrary, in the embodiment, as shown in FIG. 12, the amount of light incident to the light guiding portion 25 and the amount of light emitted from the light emitting portion 4 may be ensured since the diameter R1 of the light guiding portion 25 may be set to be sufficiently small, and the light emitting portion 4 may uniformly emit light without any irregularity in the light emission since the light guiding function of the light guiding portion 25 is not affected.

5. Molding Method of Button Cap and Button Base

Next, a molding method of the button cap 10 and the button base 20 according to the embodiment will be described.

As described above, since the button cap 10 and the button base 20 constituting the operation button 2 according to the embodiment are formed of different types of materials (that is, a non-transmissive material and a transmissive material), it is necessary to allow both members to be bonded to each other in accordance with a certain method. As a method of bonding plural components formed of different types of materials, for example, the following methods (1) to (4) may be considered.

(1) Fitting of two components obtained by injection molding (2) Dichromatic molding (3) Bonding using adhesive (4) Bonding using welding Among these examples, the numbers (2) to (4) have the following disadvantages. The dichromatic molding (double molding) of (2) has a benefit in that a product having excellent appearance may be produced. However, since it is necessary to use a particular molding machine called a double molding machine, there are problems in that it is necessary to change the installed equipment and the mold and components are expensive.

Further, in the method of bonding two components using adhesive of (3), the workability is poor since it is an atypical work, and there is a concern in that the application amount of the adhesive may be uneven, thereby causing problems in that the adhesive may leak and a secondary defect such as cobwebbing may easily occur. Further, it is difficult to separate two components which are adhered to each other by an adhesive. In the method of welding two components of (4), there are problems in that it is necessary to provide a welding facility for heat-welding or ultrasonic welding and a secondary defect such as cobwebbing occurs. Further, two components which are welded to each other may be hardly separated from each other.

Therefore, in order to avoid the disadvantages of (2) to (4), the embodiment adopts the method (1), and uses a structure in which each of the button cap 10 and the button base 20 is independently formed by injection molding using an injection mold, and both molded components are fitted to each other. As a molding method of the components having the fitting structure, the following two types of molding methods (A) and (B) may be exemplified.

(A) Molding method using a mold with slide mechanism
(B) Molding method using a mold without slide mechanism Among these examples, in the molding method using the mold with the slide mechanism of (A), there is a concern in that decoration of a molding product may be degraded since a trace of a slide trace may be formed on an appearance surface of the molding product. In order to prevent the trace of the slide trace from being formed on the appearance surface, it is necessary to precisely combine a sliding mold, but the combination is not easy. Therefore, the embodiment adopts the molding method using the mold without the slide mechanism of (B) so as to prevent the trace of the slide trace from being formed on the appearance surface of the molding product (for example, the button cap 10).

Figure 16A:
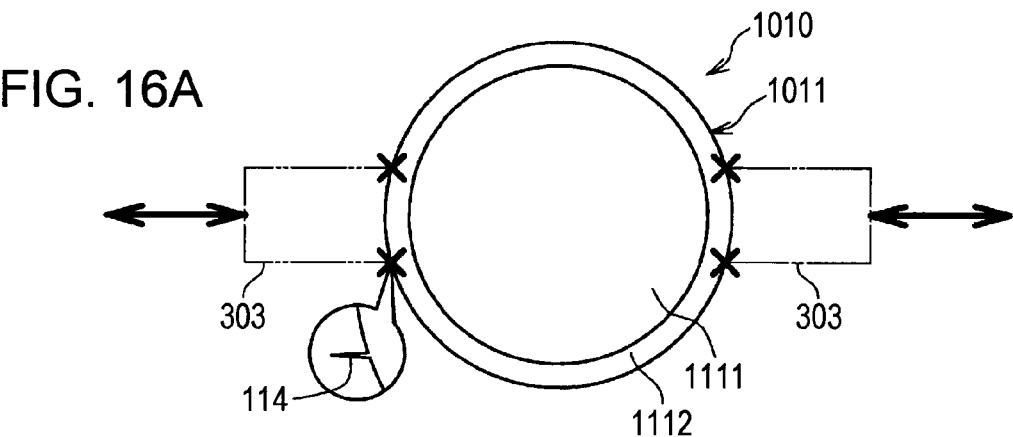
FIGS. 16A to 16C are explanatory diagrams illustrating a molding method (A) using a mold with a slide mechanism according to the comparative example.
Figure 16B:
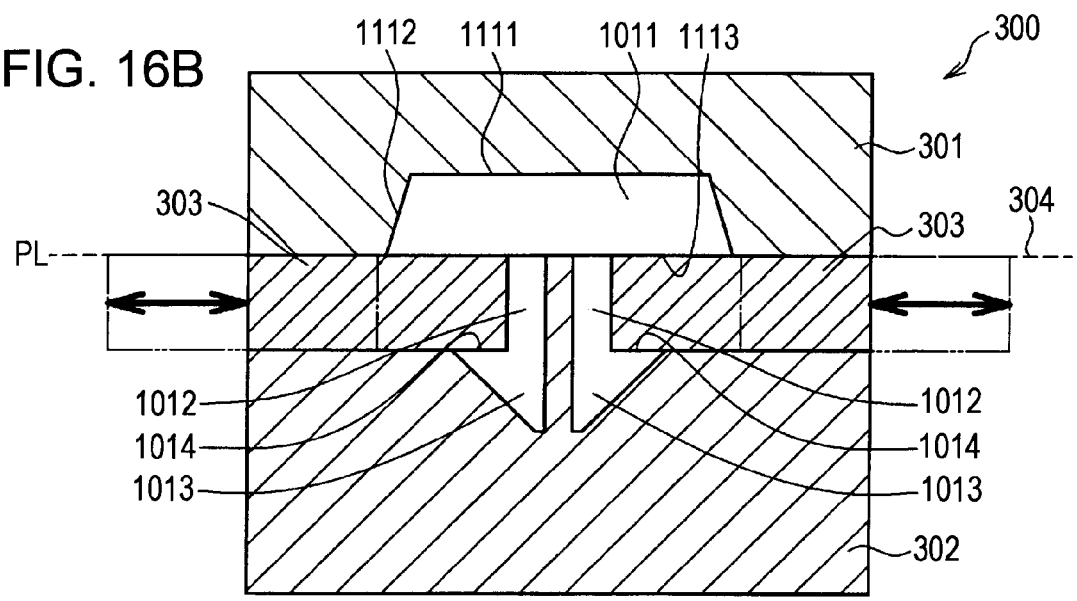
Figure 16C:
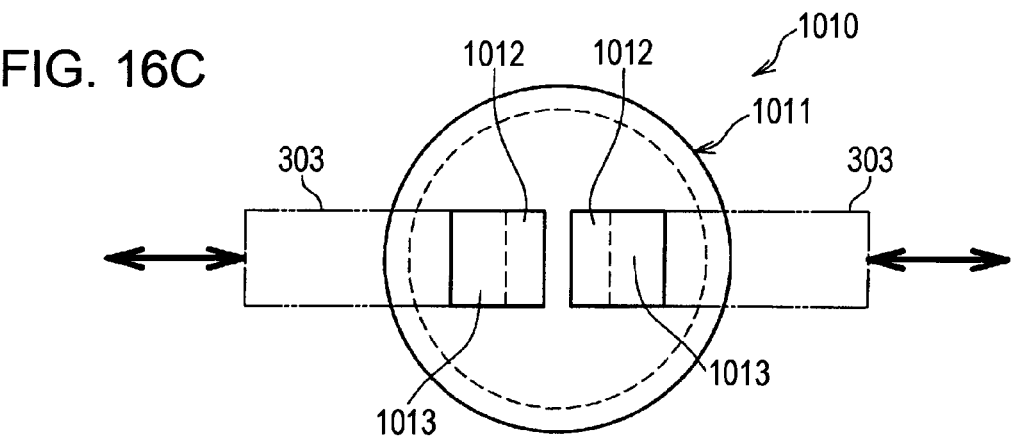
Figure 17A:
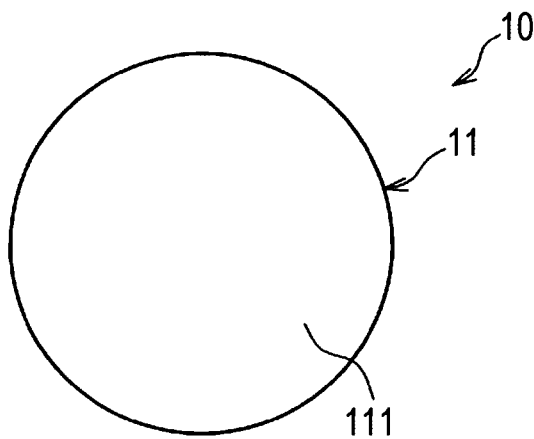
FIGS. 17A to 17C are explanatory diagrams illustrating a molding method (B) using a mold without a slide mechanism according to the embodiment.
Figure 17B:
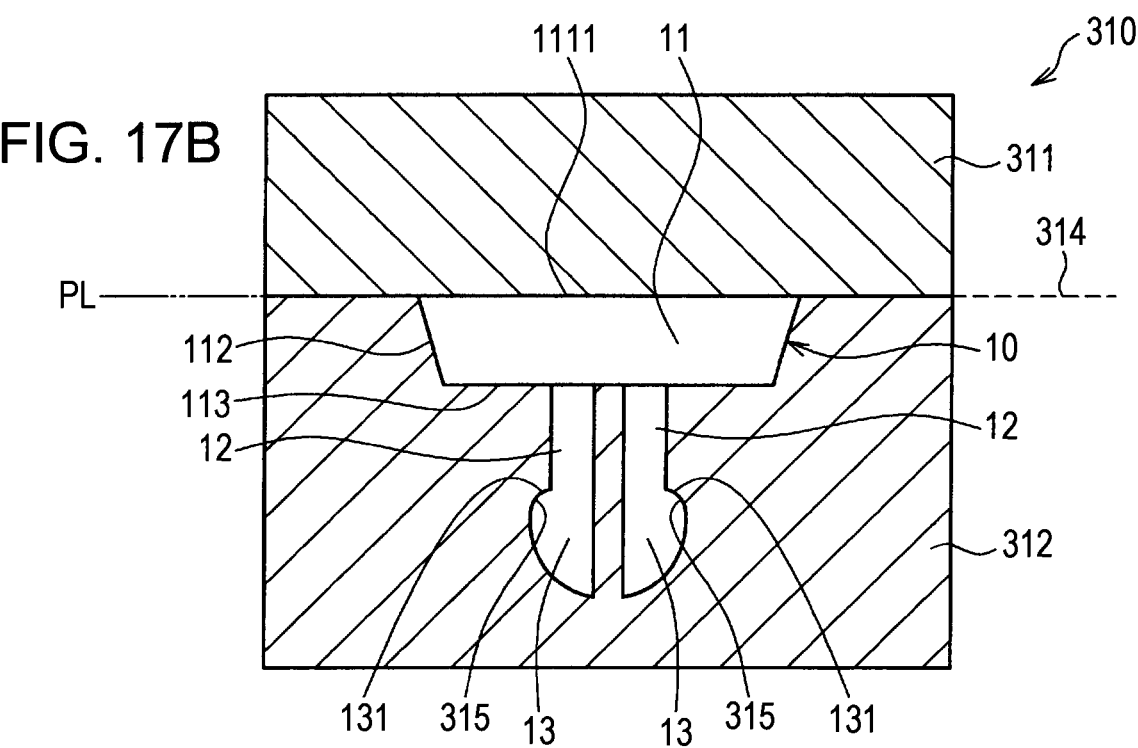
Figure 17C:
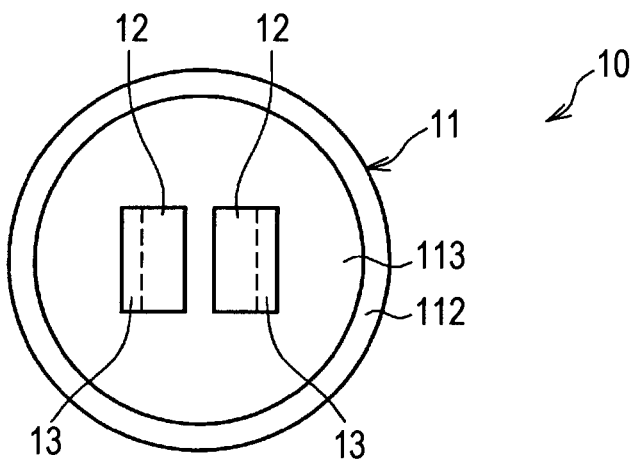

Hereinafter, two types of molding methods (A) and (B) will be described and compared with each other by referring to FIGS. 16A to 17C. FIGS. 16A to 16C are explanatory diagrams illustrating the molding method (A) using a mold 300 with a slide mechanism according to the comparative example, and FIGS. 17A to 17C are explanatory diagrams illustrating the molding method (B) using a mold 310 without a slide mechanism according to the embodiment. FIGS. 16A and 17A are front views illustrating the button cap as a molding product, FIGS. 16B and 17B are cross-sectional views illustrating the mold for injection molding, and FIGS. 16C and 17C are rear views illustrating the button cap.

As shown in FIGS. 16A to 16C, the mold 300 with the slide mechanism includes: a cavity 301 which is a female die (fixed side); a core 302 which is a male die (movable side); and a pair of slide cores 303. The mold 300 has a structure in which the core 302 and the slide core 303 are combined with the cavity 301 by using a parting line (PL) 304. The slide core 303 is movable in a sliding manner so as to mold an undercut portion of the molding product. The slide core 303 slides in the horizontal direction with respect to the cavity 301 and the core 302, and retreats so as not to disturb the protruding of the molding product before the molding product protrudes from the mold 300.

A button cap 1010 according to the comparative example is molded by the mold 300 with the slide mechanism. As shown in FIGS. 16A to 16C, the button cap 1010 includes: a disc-shaped cap body 1011; a pair of arm portions 1012; and a pair of locking claws 1013 which is respectively formed at the front ends of the arm portions 1012. Although the cap body 1011 is formed in the space within the cavity 301, a tapered surface is formed in an outer peripheral surface 1112 of the cap body 1011 so that its diameter is enlarged from a front surface 1111 toward a rear surface 1113 for the purpose of forming a draft angle of the cavity 301. Further, each of the locking claws 1013 includes a locking surface 1014 that is substantially perpendicular to the extension direction of the arm portion 1012. The locking claw 1013 has a benefit in that the locking claw 1013 may reliably lock the periphery of an insertion hole 1050 by using the locking surface 1014 when being inserted into the insertion hole 1050 of the button base 1020 (refer to FIGS. 18A and 18B). Since the locking surface 1014 of the locking claw 1013 is an undercut portion, the locking surface 1014 of the locking claw 1013 is molded by using the slide core 303.

However, in the mold 300 with the slide mechanism, it is very difficult to highly precisely combine the cavity 301, the core 302, and the slide core 303 with each other without a gap therebetween. Accordingly, when the button cap 1010 is molded by the mold 300, there is a problem in that a slide trace 1114 is easily formed in the combination portion between the core 302 and the slide core 303 in the outer frame portion (the portion indicated by the mark X of FIG. 16A) of the button cap 1010. Since the button cap 1010 is an appearance surface exposed to the outside, it is desired to avoid the formation of the slide trace 1114 in the button cap 1010 as much as possible from the viewpoint of the decoration.

Therefore, in the embodiment, the above-described button cap 10 is molded by using the molding method (B) using the general mold 310 without the slide mechanism as shown in FIGS. 17A to 17C in order to avoid the problems involved with the slide mechanism.

As shown in FIGS. 17A to 17C, the general mold 310 without the slide mechanism includes a cavity 311 which is a female die (fixed side) and a core 312 which is a male die (movable side), and does not include a slide core. The cavity 311 of the mold 310 has a flat surface aligned with a parting line 314, and the core 312 is provided with a space used for molding the entire button cap 10. The button cap 10 according to the embodiment is injection-molded by the mold 310.

By using the mold 310 with such a structure, not only the locking claw 13 and the arm portion 12 of the button cap 10, but also the cap body 11 are molded in a space inside the core 312. In order to form the draft angle of the core 312, the outer peripheral surface 112 of the cap body 11 is formed as a tapered surface of which the diameter is reduced from the front surface 111 toward the rear surface 113. Further, the locking surface 131 of the locking claw 13 is formed as an inclined surface of which an angle formed with respect to the extension direction of the arm portion 12 is a dull angle. Since the locking surface 131 of the locking claw 13 is an undercut portion, the core 312 of the mold 310 is provided with an undercut portion 315 corresponding to the locking surface 131 of the locking claw 13.

When the button cap 10 is molded by the mold 310 with the undercut portion 315, the protruding amount of the locking claw 13 is smaller than that of the locking claw 1013 of FIG. 16, and the locking surface 131 is an inclined surface, thereby forcibly extracting the locking claw 13 from the core 312. As a result of the forcible extraction, the locking claw 13 is elastically deformed to a certain extent, and is separated from the core 312 without any damage.

In this way, in the embodiment, the button cap 10 is molded by using the mold 310 without the slide mechanism, and the undercut locking claw 13 is forcibly extracted. Accordingly, since the slide trace is prevented from being formed on the appearance surface of the button cap 10 as a molding product, the molding quality and the decoration of the appearance surface of the button cap 10 exposed to the outside may be improved.

Figure 18A:
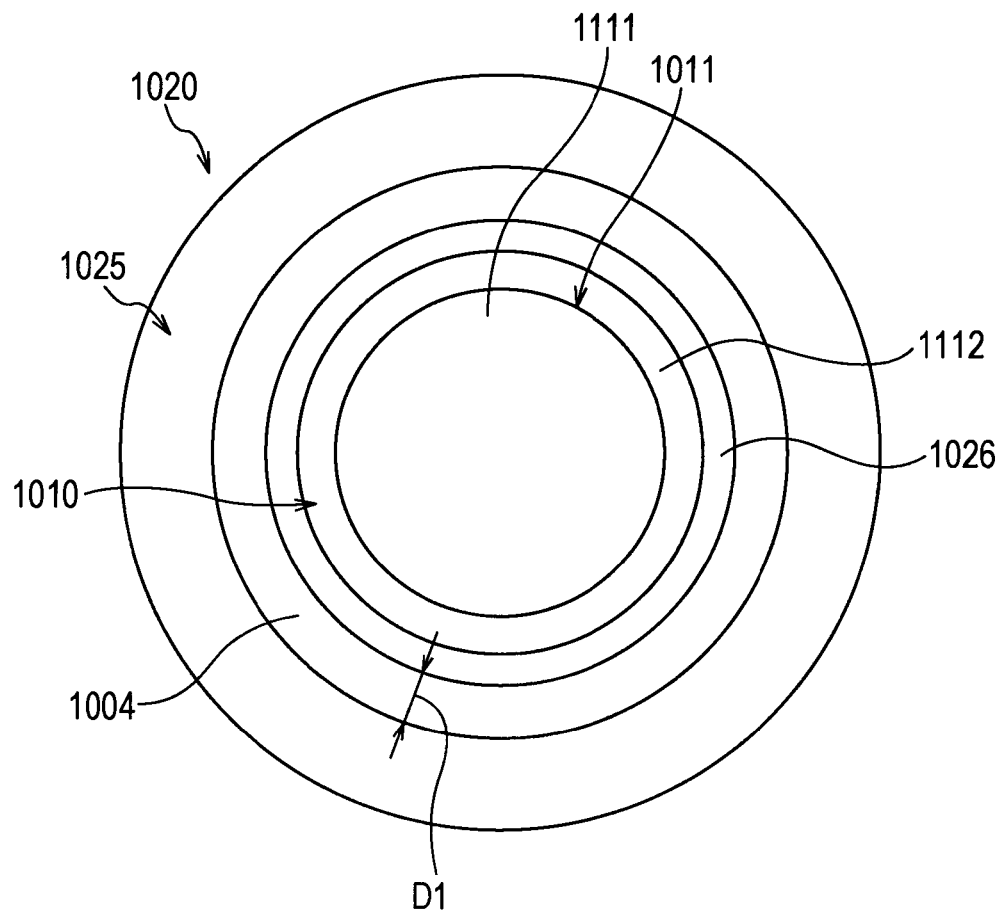
FIG. 18A is a front view schematically illustrating a fitting structure of the button cap molded by the molding method (A) according to the comparative example.
Figure 18B:
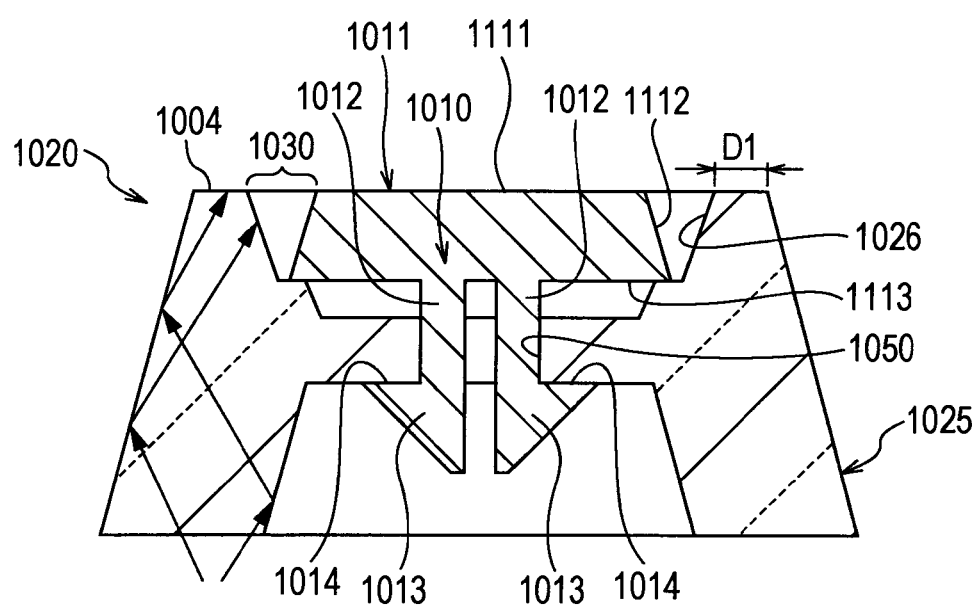
FIG. 18B is a cross-sectional view schematically illustrating the fitting structure.
Figure 19A:
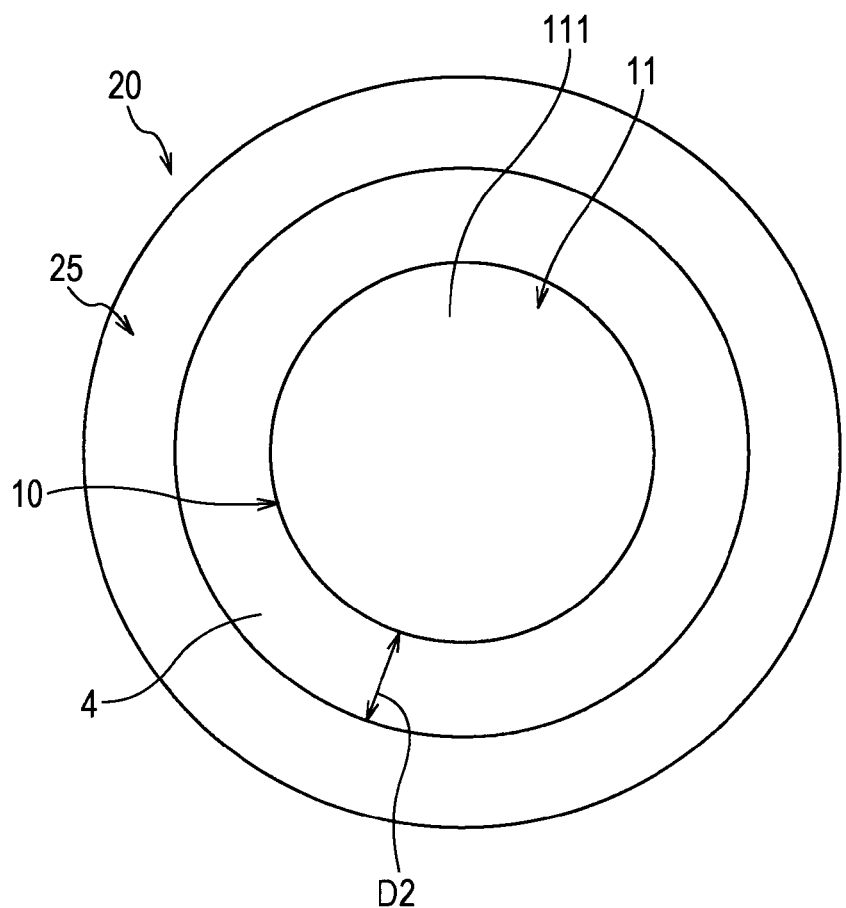
FIG. 19A is a front view schematically illustrating a fitting structure of the button cap molded by the molding method (B) according to the embodiment.
Figure 19B:
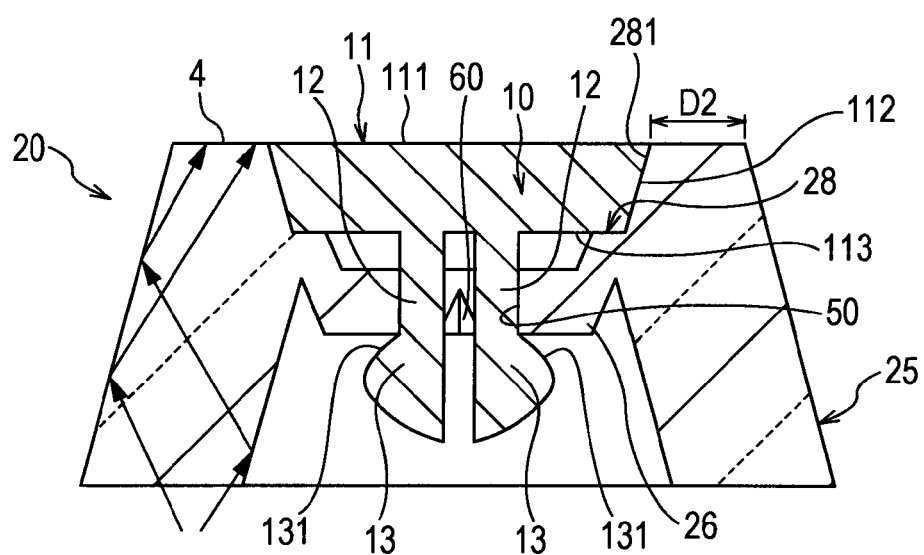
FIG. 19B is a cross-sectional view schematically illustrating the fitting structure.

Here, the fitting structures of the button caps respectively molded by two types of molding methods (A) and (B) will be described and compared with each other by referring to FIGS. 18A to 19B. FIG. 18A is a front view schematically illustrating the fitting structure of the button cap molded by the molding method (A) according to the comparative example, and FIG. 18B is a cross-sectional view schematically illustrating the same. FIG. 19A is a front view schematically illustrating the fitting structure of the button cap molded by the molding method (B) according to the embodiment, and FIG. 19B is a cross-sectional view schematically illustrating the same.

As shown in FIGS. 18A and 18B, in the fitting structure according to the comparative example, the button cap 1010 molded by using the mold 300 (refer to FIGS. 16A to 16C) with the slide mechanism is fitted to the insertion hole 1050 located at the center of a cylindrical light guiding portion 1025 of the button base 1020. At this time, the pair of locking claws 1013 of the button cap 1010 is inserted into the insertion hole 1050, and the peripheral portion of the insertion hole 1050 is locked by the perpendicular locking surfaces 1014. There is an advantage in that the locking claw 1013 is difficult to separate due to such a fitting structure.

However, in the fitting structure of FIGS. 18A and 18B, the draft angle of the outer peripheral surface 1112 of the button cap 1010 is reversed in an inner peripheral tapered surface 1026 of the button base 1020 on the front button surface side due to the structure of the mold 300 molding the button cap 1010. Accordingly, since a gap 1030 is formed between the button base 20 and the button cap 1010 on the front button surface side, there is a problem in that the appearance of the front button surface is degraded due to the gap 1030.

Further, although the end portion of the light guiding portion 1025 on the front button surface side according to the comparative example serves as an annular light emitting portion 1004, the width D1 of the light emitting portion 1004 is narrowed in the fitting structure of FIGS. 18A and 18B. Accordingly, since it is difficult for the light transmitted through the inside of the light guiding portion 1025 to reach the front button surface, there are problems in that the light emitting portion 1004 may not sufficiently emit light, and may not uniformly emit light from the periphery of the button in an annular shape.

On the contrary, as shown in FIGS. 19A and 19B, according to the fitting structure of the embodiment, the button cap 10 molded by using the mold 310 (refer to FIGS. 17A to 17C) without the slide mechanism is fitted to the insertion hole 50 located at the center of the cylindrical light guiding portion 25 of the button base 20. At this time, the pair of locking claws 13 of the button cap 10 is inserted into the insertion hole 1050, and locks the engagement portion 26 in the periphery of the insertion hole 50 by using the inclined locking surfaces 131.

The locking claws 13 have a disadvantage in that the locking claws 13 are easily separated from the insertion hole 50 compared with the locking claws 1013 according to the comparative example of FIGS. 18A and 18B. Therefore, in the embodiment, the rib 60 having a trigonal pyramid shape is formed inside the insertion hole 50 in a protruding manner, and the rib 60 is interposed between the locking claws 13 inserted into the insertion hole 50. Since the locking claws 13 may be prevented from being bent inward by the rib 60, the locking claws 13 may be prevented from being separated from the insertion hole 50.

Further, according to the fitting structure of the embodiment, the draft angle of the outer peripheral surface 112 of the button cap 10 is equal to the draft angle of the inner peripheral tapered surface 281 of the fitting portion 28 of the button base 20 due to the structure of the mold 310 (refer to FIGS. 17A to 17C) molding the button cap 10. For this reason, the inner peripheral tapered surface 281 of the fitting portion 28 comes into close contact with the outer peripheral surface 112 of the cap body 11 so that a gap is not formed therebetween when the cap body 11 is fitted to the fitting portion 28. Accordingly, the decoration may be improved in such a manner that the appearance surfaces of the front button surface are located at the same level in the height.

Furthermore, the end portion of the light guiding portion 25 on the front button surface side according to the embodiment also serves as the annular light emitting portion 4. Here, according to the fitting structure (refer to FIGS. 19A and 19B) of the embodiment, since the width D2 of the light emitting portion 4 may be set to be larger than the width D1 (refer to FIGS. 18A and 18B) of the light emitting portion 1004 according to the comparative example, the area of the light emitting portion 4 may be increased. Accordingly, since a large amount of light emitted from the light emitting element 40 may be guided to the light emitting portion 4 on the front button surface side by the light guiding portion 25, the light emitting portion 4 in the periphery of the button cap 10 may uniformly emit light in an annular shape.

6. Summary

As described above, the fitting structure between the button cap 10 and the button base 20 in the luminous button device according to the embodiment has been described in detail. According to the fitting structure of the embodiment, the rib 60 having a trigonal pyramid shape protrudes from the inside of the insertion hole 50, into which the pair of locking claws 13 of the button cap 10 is inserted, so as to have the pair of inclined surfaces 61 respectively corresponding to the locking claws 13. The shape and the disposition of the rib 60 are determined in consideration of the insertion workability or the insertion/extraction force of the locking claws 13 with respect to the insertion hole 50.

By providing the rib 60, the locking claws 13 are guided by the inclined surfaces 61 of the rib 60, and are bent to be twisted in an inverted v shape, so that the locking claws 13 may be smoothly and easily inserted into the insertion hole 50. Further, since the rib 60 is interposed between the locking claws 13 inserted into the insertion hole 50, the locking claws 13 may be prevented from being separated from the insertion hole 50. In this way, according to the embodiment, a structure may be provided in which the button cap 10 and the button base 20 are easily fitted to each other, and are difficult to separate from each other after they are fitted to each other.

According to the embodiment, the function of preventing the separation of the fitted components may be appropriately realized just by forming the rib 60 in the insertion hole 50 of the button base 20, and the number of components does not increase since additional components such as a spacer are not demanded. Accordingly, a simple fitting structure having a low manufacturing cost may be provided, and the fitting operation between the button cap 10 and the button base 20 may be simplified.

According to the embodiment, since the button cap 10 is difficult to separate from the button base 20 after they are fitted to each other, welding or fixing using an adhesive for preventing the separation is not demanded. Further, it is advantageous in that there are no secondary defects such as cobwebbing or melting of the member as in the case of the welding or the fixing using an adhesive. Furthermore, it is very difficult to separate the button cap 10 and the button base 20 fixed to each other by welding or adhesive. However, according to the fitting structure of the embodiment, the button cap 10 and the button base 20 fitted to each other may be separated from each other by using a tool or the like, and be reworked.

Further, each of the button cap 10 and the button base 20 according to the embodiment is integrally injection-molded by using the mold 310 without the slide mechanism. As described above, since there is a concern in that the slide trace may be formed on the appearance surface when the mold 300 with the slide mechanism is adopted, a problem arises in that the decoration is degraded (refer to FIGS. 16A to 16C). Therefore, the embodiment solves the problem of the slide trace by adopting a structure in which the locking claws 13 having an undercut structure are formed on the side of the button cap 10, and the rib 60 is formed on the side of the button base 20. In this way, according to the embodiment, a molding defect such as a slide trace does not occur since the slide mechanism is not used, so that the quality and the decoration of the molding product may be improved. Further, an increase in the molding cost may be suppressed since it is not necessary to provide the slide mechanism in the mold.

According to the fitting structure of the embodiment, since a gap is not formed between the button cap 10 and the button base 20 in the appearance surface on the front button surface side, an excellent appearance equivalent to that of the button formed by dichromatic molding may be realized.

Further, since the button base 20 is formed of a milky white transmissive material, the button base 20 serves as the light guiding portion 25 that guides the light emitted from the light emitting element 40 on the rear button surface side toward the front button surface. Since the light guiding portion 25 has a structure appropriately guiding the direct light 42 and the indirect light 43 emitted from the light emitting element 40 to the light emitting portion 4 on the front button surface, the annular light emitting portion 4 may uniformly emit light without any irregularity in the light emission. In particular, since the tapered light incident surface 252 is formed in the inner peripheral surface of the light guiding portion 25 so as to face the light emitting element 40, the light guiding portion 25 may receive a large amount of light thereinto from the light incident surface 252, and guide the light to the light emitting portion 4.

Furthermore, the fitting structure according to the embodiment includes the locking claws 13, the insertion hole 50, and the rib 60, and is disposed to be compact in size with respect to the center of the light guiding portion 25. The fitting structure fixes the button cap 10 to a narrow range at the center inside the light guiding portion 25. Accordingly, since the light guiding function of the light guiding portion 25 is not disturbed by the fitting structure according to the embodiment, the light guiding portion 25 may guide a large amount of light from the light emitting element 40 to the light emitting portion 4. In this way, it is thought that the shape of the fitting structure according to the embodiment is optimal from the viewpoint of the attachability of the button cap 10, the light guiding performance of the light guiding portion 25, the light emitting performance of the light emitting portion 4, and the like.

The present application contains subject matter related to that disclosed in Japanese Priority Patent Application JP 2010-028225 filed in the Japan Patent Office on Feb. 10, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A luminous button device comprising:
    a button base which is integrally formed of a transmissive material; and
    a button cap which is integrally formed of a non-transmissive material and is fitted to the button base,
    wherein the button cap includes
        a cap body;
        a pair of arm portions which extends from the rear surface of the cap body with a gap interposed therebetween; and
        a pair of locking claws which is formed at the front ends of the pair of arm portions,
    wherein the button base includes
        a movable portion which is movable in a direction of pressing a switch disposed on the rear surface side of the button base in accordance with a pressing force from the front button surface side; and
        a support portion which supports the movable portion so as to be movable in the direction, and
    wherein the movable portion of the button base includes
        a light guiding portion which guides light emitted from a light emitting element disposed on the rear surface side of the button base to an end portion on the front button surface side;
        a fitting portion which is formed on the front button surface side of the light guiding portion, and is fitted to the cap body so as to surround the outer periphery of the cap body of the button cap;
        an engagement portion which is formed inside the light guiding portion, has an insertion hole allowing the pair of locking claws of the button cap to be inserted thereinto, and engages with the pair of locking claws inserted into the insertion hole; and
        a rib which is formed in a trigonal pyramid shape in the inner surface of the insertion hole in a protruding manner, and includes a pair of inclined surfaces disposed at positions respectively corresponding to the pair of locking claws inserted into the insertion hole.

2. The luminous button device according to claim 1, wherein when the pair of locking claws is inserted into the insertion hole, the pair of locking claws respectively comes into contact with the pair of inclined surfaces of the rib so as to be twisted along the pair of inclined surfaces, and
wherein when the pair of locking claws inserted into the insertion hole engages with the engagement portion, the rib is interposed between the pair of arm portions or the pair of locking claws.

3. The luminous button device according to claim 1, wherein the cap body is formed in a disc shape, and
wherein the light guiding portion is formed in a cylindrical shape which extends from the front button surface to the rear button surface and of which the central axis is the optical axis of the light emitting element.

4. The luminous button device according to claim 3, wherein a tapered light incident surface is formed in the inner peripheral surface of the light guiding portion so as to face the light emitting element.

5. The luminous button device according to claim 1, wherein the button cap is molded by using a mold having an undercut portion corresponding to the locking claws.

6. An electronic apparatus comprising:
    the luminous button device according to claim 1; and
    a control unit configured to perform a predetermined operation on the basis of a signal generated when the luminous button device is operated.

* * * * *